(12) United States Patent
Akiyama et al.

(10) Patent No.: US 6,512,798 B1
(45) Date of Patent: Jan. 28, 2003

(54) DIGITAL COMMUNICATION SYSTEM OF ORTHOGONAL MODULATION TYPE

(75) Inventors: Toshiyuki Akiyama, Tokorozawa (JP); Atsushi Miyashita, Tokorozawa (JP); Nobuo Tsukamoto, Akishima (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/262,840

(22) Filed: Mar. 5, 1999

(30) Foreign Application Priority Data

Mar. 6, 1998 (JP) .......................................... 10-054984

(51) Int. Cl.$^7$ ........................... H04L 5/12; H04L 27/36; H03H 7/30; H03K 5/159
(52) U.S. Cl. ...................... 375/261; 375/229; 375/232; 375/298
(58) Field of Search ................................ 375/229, 230, 375/232, 261, 279, 280, 281, 298, 324, 329, 332; 329/304, 309; 332/103, 104; 708/300, 319, 322, 323; 370/206

(56) References Cited

U.S. PATENT DOCUMENTS

| 5,079,513 A | * | 1/1992 | Noguchi et al. | ............ | 329/304 |
| 5,293,407 A | * | 3/1994 | Shibata | ........................ | 332/103 |
| 5,781,076 A | * | 7/1998 | Iwamatsu et al. | ........... | 375/261 |

FOREIGN PATENT DOCUMENTS

| EP | 0693844 | 1/1996 |
| JP | 09181786 | 7/1997 |

OTHER PUBLICATIONS

G. Shapiro, FIR Switched–Capacitor Modulators for Discrete QAM, Proceedings of the International Symposium on Circuits and Systems, Kyoto, Jun. 5–7, 1985, vol. 3, pp. 1629–1632.

Wang et al, Digital IF Modulator and Demodulator Design for Transmission over Band–limited Channels, Signal Processing, 1996, 3$^{rd}$ International Conference on Beijing, China, Oct. 14–18, 1996, pp. 1242–1245.

* cited by examiner

Primary Examiner—Betsy L. Deppe
(74) Attorney, Agent, or Firm—Antonelli, Terry, Stout & Kraus, LLP

(57) ABSTRACT

A digital signal communication system includes a transmission circuit or a receiving circuit for digitally transmitting two types of signals by orthogonal modulation. The transmission circuit includes an orthogonal modulator and a nonrecursive digital low-pass filter having the same frequency characteristic as a predetermined frequency characteristic of the output signal of the orthogonal modulator. The receiving circuit includes an orthogonal demodulator and a nonrecursive digital low-pass filter having the same frequency characteristic as a predetermined frequency characteristic of the output signal of the orthogonal demodulator. The total number of taps required for determining the frequency characteristic of the nonrecursive digital low-pass filter is set to H, and the series of tap coefficients is set as $C_1$, $C_2$, $C_3$, ..., $C_H$, where H is an arbitrary positive integer of not less than 2. The nonrecursive digital low-pass filters include a first low-pass filter for filtering one of the two types of signal and a second low-pass filter for filtering the other type of the signal. The first low-pass filter has taps about one half of H including a tap coefficient series $C_1$, $C_3$, $C_5$, ..., $C_{ODD}$, and the second low-pass filter has taps about one half of H including a tap coefficient series $C_2$, $C_4$, $C_6$, ..., $C_{EVEN}$.

11 Claims, 21 Drawing Sheets

(H=2R+1)

DIGITAL COMMUNICATION SYSTEM OF ORTHOGONAL MODULATION TYPE

BACKGROUND OF THE INVENTION

The present invention relates to a system for transmitting two types of signal by orthogonal modulation, or more in particular to a digital signal transmission system comprising an orthogonal modulation transmission unit and an orthogonal demodulation receiving unit having a digital configuration.

In recent years, a signal transmission system of orthogonal modulation type such as QPSK or QAM scheme has been employed for improving the transmission rate in the digital radio communication for mobile units and terrestrial communication. The orthogonal modulation scheme is for transmitting two types of signals by orthogonal modulation using two types of mutually orthogonal carriers expressed as $$\cos(2\pi \times fc \times t)$$

and $$\sin(2\pi \times fc \times t)$$

where t is the time and fc the carrier frequency.

The conventional digital signal transmission system of orthogonal modulation type has employed an orthogonal modulator/demodulator circuit mainly using a mixer of analog configuration for the apparent reason of its low cost and small circuit size.

The conventional signal transmission system using this orthogonal modulator/demodulator circuit of analog type will be explained with reference to FIGS. 19 and 20.

First, FIG. 19 shows an example of a conventional transmission circuit of orthogonal modulation type. The information code input from an input terminal 1 is converted into two types of baseband digital signals Id(n), Qd(n) by a transmission signal processing circuit 2 and then applied to an orthogonal modulator 3, where n is an integer not less than 1 indicating the order of the clock signal pulses.

The signals Id(n), Qd(n) input to the orthogonal modulator 3 are converted into analog signals by D/A converters 4i, 4q, respectively. Then, the transmission bandwidth of signals is limited to a predetermined value B by LPFs (low-pass filters) 5i, 5q of analog configuration.

The signals I(t), Q(t) output from the LPFs 5i, 5q are input to a mixer 6 where they are orthogonally modulated in analog fashion by the operation according to equation (1) below.

$$D(t)=I(t)\times\cos(2\pi \times fc \times t)+Q(t)\times\sin(2\pi \times fc \times t) \quad (1)$$

The signal D(t) thus orthogonally modulated is input to a BPF (bandpass filter) 7 where the unrequited component generated in the mixer 6 is removed. The output signal of the BPF 7 is supplied to an up converter 8 where it is converted to a carrier signal of a still higher frequency f'c. The high-frequency transmission signal is transmitted from an antenna 9.

FIG. 20 shows an example of a conventional receiving circuit of orthogonal demodulation type. The signal received by an antenna 10 is restored to the original orthogonal modulation signal D(t) by a down converter 11.

The orthogonal modulation signal D(t) supplied to an orthogonal demodulator 13 is input to a mixer 14 and converted into a signal of a carrier frequency fc. The mixer 14 processes the signal D(t) in two ways by equations (2) and (3) shown below, and orthogonally demodulates the two types of signals I(t), Q(t) in analog fashion using the orthogonality of the trigonometric function.

$$I(t)=D(t)\times\cos(2\pi \times fc \times t) \quad (2)$$

$$Q(t)=D(t)\times\sin(2\pi \times fc \times t) \quad (3)$$

The two signals I(t), Q(t) orthogonally demodulated in this way have the unrequited components thereof removed by the analog LPFs 15i, 15q, respectively. The signals I(t), Q(t) are converted into digital signals Id(n), Qd(n) by the A/D converters 16i, 16q, respectively, and supplied to a receiving signal processing circuit 17.

The receiving signal processing circuit 17 demodulates the two digital input signals Id(n), Iq(n), and outputs the resulting information code from an output terminal 18.

In the conventional analog modulation system described above, the two types of carrier signal used for orthogonal modulation and demodulation, i.e. the two carrier signals expressed by "cos" and "sin" in FIGS. 19 and 20, if insufficient in orthogonality (accuracy of $2\pi$ in phase difference), develop inter-code interference between the two types of components and increases the error rate of the demodulated code, resulting in a deteriorated communication quality.

In view of this, in the prior art, a mixer of analog configuration regulated to high accuracy is used so that the orthogonal (phase difference) error between the two reference carrier waves assumes a sufficiently small value of 1 degree or less.

The conventional system described above fails to take digitization into consideration and poses the problem of difficulty of improving the performance thereof.

Specifically, in recent years, schemes such as 64QAM or OFDM with a large number of points more than the conventional BPSK and QPSK schemes have come to be employed. These schemes require a still higher accuracy of orthogonality. The analog technique, however, has its own limit of improving the orthogonality accuracy and therefore is difficult to improve the performance of the transmission system.

In view of this, the inventors have studied a digital orthogonal modulator and a digital orthogonal demodulator in which orthogonal modulation and orthogonal demodulation are performed by digital signal processing in order to secure a sufficiently high accuracy required for orthogonality. An example will be explained with reference to FIGS. 21 and 22.

First, the digital orthogonal modulator of FIG. 21 is a digital version of the orthogonal modulator 3 of analog configuration shown in FIG. 19. In similar fashion, the digital orthogonal demodulator of FIG. 22 is a digital version of the orthogonal demodulator 13 of analog configuration shown in FIG. 20. The circuits other than the orthogonal modulator and the orthogonal demodulator are the same as those of FIGS. 19 and 20. Therefore, the configuration and operation of the orthogonal modulator and the orthogonal demodulator will be mainly described below.

First, typical signal waveforms of the first digital signal Id(n) and the second digital signal Qd(n) of a sampling frequency fd supplied from the transmission signal processing circuit 2 are illustrated in FIGS. 23(a), (b).

In FIGS. 23(a), (b), the solid curve represents the signal waveform of the I signal before sampling; and the dashed curve represents the signal waveform of the Q signal before sampling. The corresponding sampling signals are also indicated by solid and dashed arrows, respectively.

Of all the signals applied to the digital orthogonal modulator shown in FIG. 21, the first digital signal Id(n) is converted to a signal I'd4(m) of a quadruple sampling frequency 4×fd by a first quadruple sampling converter 19i in such a manner that three zeros are inserted between the nth sampling value Id(n) and the (n+1)th sampling value Id(n+1) as shown in FIG. 23(c), where m is an integer representing the order of the clock signal for the quadruple sampling operation.

The signal I'd4(m) thus converted, as shown typically in FIG. 24, contains the unrequited harmonic components 20. In FIG. 24, the hatched portions show the bands of the required signal information components.

The digital LPF 21i, like the conventional LPF 5i shown in FIG. 19, limits the signal I'd4(m) to the bandwidth B while at the same time removing the unrequited harmonic components 20.

As a result, the signal waveform of the output signal Id4(m) of the digital LPF 21i assumes a sampling waveform with zeros filled between the signals as shown in FIG. 23(e).

This is also the case with the second signal Qd(n). As shown in FIG. 23(d), the second signal Qd(n) is converted into a signal Q'd4(m) of a quadruple frequency 4×fd by a second quadruple sample converter 19q, limited to the bandwidth B by a digital LPF 21q, and as shown in FIG. 23(f), converted into the signal Qd4(m) with zeros filled therebetween.

Assume that the carrier frequency fc of the orthogonal modulation signal is set to fd in this way. Equation (1) indicated above as an operation formula for orthogonal modulation can be expressed as $$Dd4(m)=Id4(m) \times \cos(2\pi \times m/4) + Qd4(m) \times \sin(2\pi \times m/4) \quad (4)$$

In equation (4), the term on the right side containing "cos" assumes values 1 and −1 alternately when m is an even number including zero, and assumes zero when m is an odd number.

The term on the right side containing "sin", on the other hand, assumes the values of 1 and −1 alternately when m is an odd number and assumes zero when m is an even number including zero.

Therefore, equation (4) can be expressed sequentially in accordance with m, as follows.

$$
\begin{aligned}
m &= 0 \rightarrow Dd4(0) = Id4(0) \\
m &= 1 \rightarrow Dd4(1) = Qd4(1) \\
m &= 2 \rightarrow Dd4(2) = -Id4(2) \\
m &= 3 \rightarrow Dd4(3) = -Qd4(3) \\
m &= 4 \rightarrow Dd4(4) = Id4(4) \\
m &= 5 \rightarrow Dd4(5) = Qd4(5) \\
&\vdots \qquad \vdots
\end{aligned}
$$

Actually, therefore, the orthogonal modulation can be carried out and the orthogonal modulation signal Dd4(m) as shown by the signal waveform of FIG. 23(g) can be produced by sequentially switching the signals Id4(m), Qd4(m) and signals of opposite polarities −Id4(m), −Q4d(m) without executing the multiplication of equation (4).

The digital orthogonal modulator of FIG. 21 uses a digital orthogonal modulation circuit 22 operating according to this method. As shown in FIG. 21, two polarity inverting circuits 22i, 22q and a cyclic switch 22s operating at a frequency fc (=4×fd) are used. The signals Id4(m) and Qd4(m) are converted into polarity inverted signals −Id4(m) and −Qd4(m), respectively, by the polarity inverting circuits 22i and 22q. The signals Id4(m), Qd4(m), −Id4(m), −Qd4(m) are extracted selectively sequentially by the clock signal of frequency fc through the switch 22s, thereby producing an orthogonal modulation signal Dd4(m) shown in the waveform diagram of FIG. 23(g).

The orthogonal modulation signal Dd4(m) output from the digital orthogonal modulation circuit 22 is then converted into an analog signal by a D/A converter 24. The analog orthogonal modulation signal D(t) with the unrequited harmonic components thereof removed by the BPF 25 is output from the digital orthogonal modulator.

In this process, the two digital LPFs 21i, 21q are required to have the same characteristic.

It is common practice, therefore, to employ digital LPFs having a nonrecursive (FIR: finite impulse response) type circuit configuration and the same tap coefficient, as shown in FIG. 25.

The digital LPF shown in FIG. 25 includes a shift register 26, memories 27-1, 27-2, . . . , 27-H, multiplier circuits 28-1, 28-2, . . . , 28-H and a Σ (summing) circuit 29.

The shift register 26 includes multiple stages of concatenated memory cells for sequentially transferring and storing input serial signals I'd4(p+1), I'd4(p+2), . . . , I'd4(p+H), stage by stage, in response to each clock pulse of frequency 4×fd. The memories 27-1, 27-2, . . . , 27-H function to store H tap coefficients $C_1, C_2, \ldots, C_H$ required for limiting the bandwidth to B. In the above description, p is an arbitrary integer.

The shift register 26 executes the operation of equation (5) below for each clock pulse using the tap coefficient values stored in the memories 27-1, 27-2 and so forth, and sequentially outputs the calculated values Id4(p).

$$Id4(p)=C_1 \times I'd4(p+1)+C_2 \times I'd4(p+2)+C_3 \times I'd4(p+3)+ \ldots + \ldots +C_H \times I'd4(p+H) \quad (5)$$

In the process, the H multiplier circuits 28-1, 28-2, . . . , 28-H multiply the tap coefficients $C_1, \ldots, C_H$ by the signals values I'd4(p+1), . . . , I'd4(p+H). Further, the Σ circuit 29 includes a plurality of adder circuits and outputs the total sum of the values $C_1 \times I'd4(p+1)$ to $C_H \times I'd4(p+H)$ multiplied in the multiplier circuits 28-1 to 28-H. In this way, the multiplier circuits 28-1 to 28-H function as a digital LPF.

Now, the digital orthogonal demodulator of FIG. 22 will be explained. This demodulator carries out orthogonal demodulation by processing the signals in substantially reverse way to the digital orthogonal modulator of FIG. 21.

In FIG. 22, the orthogonal modulation signal D(t) output from a down converter 11 (FIG. 20) has the unrequited frequency components thereof removed by the BPF 30. The signal D(t) is sampled at the sampling frequency of 4×fd by the A/D converter 31 and thus converted into a digital orthogonal modulation signal Dd4(m).

The orthogonal modulation signal Dd4(m) thus sampled has a signal waveform as shown in FIG. 26(a) which is identical to that of FIG. 23(g).

Assume that the carrier frequency fc of the orthogonal modulation signal is set to fd. Equations (2) and (3) shown as operation formulae for orthogonal demodulation are expressed as equations (6) and (7), respectively.

$$Id4(m)=Dd4(m) \times \cos(2\pi \times m/4) \quad (6)$$

$$Qd4(m)=Dd4(m) \times \sin(2\pi \times m/4) \quad (7)$$

Then, as in equation (4) for the digital orthogonal modulator shown in FIG. 21, the orthogonal demodulation can be performed with a simple circuit configuration.

Specifically, equation (6) including "cos" assumes values of 1 and −1 alternately when m is an even number including zero, and assumes zero when m is an odd number. Equation (7) including "sin", on the other hand, assumes values of 1 and −1 alternately when m is an odd number and zero when m is an even number including zero.

First, equation (6) assumes the following values sequentially according to m.

$$m=0 \rightarrow Dd4(0)=Id4(0)$$

$$m=1 \rightarrow Dd4(1)=0$$

$$m=2 \rightarrow Dd4(2)=-Id4(2)$$

$$m=3 \rightarrow Dd4(3)=0$$

Then, equation (7) assumes the following values also sequentially according to m.

$$m=0 \rightarrow Dd4(0)=0$$

$$m=1 \rightarrow Dd4(1)=Qd4(1)$$

$$m=2 \rightarrow Dd4(2)=0$$

$$m=3 \rightarrow Dd4(3)=-Id4(3)$$

$$m=4 \rightarrow Dd4(4))=0$$

In this case, too, the orthogonal demodulation can be accomplished by sequentially switching and independently extracting the signals Id4(m), Qd4(m) and polarity-inverted signals −Id4(m), −Qd4(m) without directly executing the multiplication of equations (6) and (7). Thus, the orthogonal demodulation signals Id4(m) and Qd4(m) are obtained as shown in FIGS. 26(b), (C).

FIG. 22 shows a digital orthogonal demodulator using a digital orthogonal demodulation circuit 32 operating according to the above-mentioned method. As shown in FIG. 22, this digital orthogonal demodulator includes two polarity inverting circuits 32i, 32q and cyclic switches 32si, 32sq operating at the frequency of fc (=4×fd).

The signal Dd4(m) from the A/D converter 31 is output as a polarity-inverted signal −Dd4(m) by the polarity inverting circuits 32i, 22q. These signals are sequentially alternated between 0 (35i, 35q) and Dd4(m), −Dd4(m) for each clock of the frequency fc and selectively output, thereby producing the orthogonal demodulation signals Id4(m), Qd4(m) as shown in FIGS. 26(b), (c).

In this way, the signal Id4(m) output from the digital orthogonal demodulation circuit 32, as shown in FIG. 26(b), assumes a waveform containing a 0 value for each sampling signal.

This portion of 0 value is interpolated by the digital LPF 33i as shown in FIG. 26(d). The signal of FIG. 26(d) is sampled at the sampling frequency fd by the 1/4 sampling converter 34i thereby to output the signal Id(n) orthogonally demodulated as shown in FIG. 26(f).

In similar fashion, the signal Qd4(m) output from the digital orthogonal demodulation circuit 32, as shown in FIG. 26(c), assumes a waveform containing a 0 value for each sampling signal. The signal Qd4(m) has the 0 value portion interpolated by the digital LPF 33q as shown in FIG. 26(e). The signal of FIG. 26(e) is then resampled by the 1/4 sample converter 34q thereby to output the signal Qd(n) orthogonally demodulated as shown in FIG. 26(g).

As shown in FIG. 25, a nonrecursive (FIR type) circuit having the same coefficient values as the digital orthogonal modulator described with reference to FIG. 21 is used as the digital LPFs 33i and 33q.

The nonrecursive digital filter used in this case requires a considerable number of adder circuits and multiplier circuits.

The multiplier circuits, which assumes a considerable circuit size, are desirably as few as possible.

In the cases of FIGS. 21 and 22 which use a nonrecursive digital LPF of FIG. 25, however, many multiplier circuits are required leading to an extremely large circuit size. An increased size of the multiplier circuits is indicative of an increased number of taps of the digital filter. In other words, as many taps as multiplier circuits are required. In forming a digital filter on a integrated circuit, an increased number of multiplier circuits and an increased number of taps bring about an increased space of the integrated circuit, resulting in an increased manufacturing cost of the filter. The steeper the frequency cutoff characteristic required of the LPF, the more taps (multiplier circuits) are required. In the case of an orthogonal frequency division multiplexing (OFDM) modulation constituting one of the orthogonal modulation schemes, for example, the occupied bandwidth is fully utilized. For the transmission signal not to leak to adjacent other frequency bands, therefore, a digital LPF of at least about 50 taps is required.

Since 50 or more taps are required for the digital LPF, the transmission system requires twice as many multiplier circuits, or about 100 multiplier circuits. This is because two LPFs are used for each tap.

The nonrecursive digital LPF in the receiving system also requires as many multiplier circuits. Thus, a total of about 200 multiplier circuits are required for the transmission system and the receiving system combined.

As long as the information transmission rate remains low, the use of the multiplier circuits by time division can reduce the number of the multiplier circuits actually required to be formed on the filter circuit.

With the increase in the transmission rate, however, the parallel operation of all the multiplier circuits is required due to the limited operating speed of each multiplier circuit. It will be necessary, for example, to form as many as 200 multiplier circuits. A simple digitization, therefore, constitutes a stumbling block to a higher transmission rate due to the increased circuit size of the multiplier circuits.

SUMMARY OF THE INVENTION

According to an aspect of the present invention, there is provided a digital signal transmission system in which the requirement for a high transmission rate can be met without increasing the circuit size of the digital orthogonal modulator/demodulator.

According to another aspect of the invention, there is provided a digital signal communication system comprising a transmission circuit or a receiving circuit in which two types of signals are digitally transmitted by orthogonal modulation. In a digital signal communication system according to this invention, the transmission circuit includes an orthogonal modulator and a nonrecursive digital low-pass filter having the same frequency characteristic as a predetermined frequency characteristic of the output signal of the orthogonal modulator, and the receiving circuit includes an orthogonal demodulator and a nonrecursive digital low-pass filter having the same frequency characteristic as a predetermined frequency characteristic of the output signal of the orthogonal demodulator. The total number of taps required for determining the frequency characteristic of the nonrecursive digital low-pass filters is assumed to be H, and the series of the tap coefficients to be $C_1, C_2, C_3, \ldots C_H$, where H is an arbitrary positive integer not less than 2. The nonrecursive digital low-pass filters have a first low-pass filter for filtering one of the two types of signals and a second low-pass filter for filtering the other type of the signals. The first low-pass filter has substantially one half of H taps including a series of tap coefficients $C_1, C_3, C_5, \ldots C_{2R+1}$, and the second low-pass filter has substantially one half of the H taps including a series of tap coefficients $C_2, C_4, C_6, \ldots, C_{2R}$, where R is an arbitrary positive integer.

The use of tap coefficients meeting the above-mentioned condition can reduce the taps of the digital LPFs almost by one half. Specifically, the number of multiplier circuits required can be reduced as remarkably as by one half for a smaller circuit size.

DESCRIPTION OF THE PREFERRED EMBODIMENTS

A digital signal transmission system according to the present invention will be explained below in detail with reference to the embodiments shown in the accompanying drawings.

First, reference is made to a digital orthogonal modulator according to a first embodiment of the invention.

To assure full understanding of the operating principle of the invention, an explanation will be given with reference to the digital orthogonal modulator shown in FIG. 21. As already described, the orthogonal modulation process shown by equation (4) can be realized with a simple switch circuit.

Figure 21:
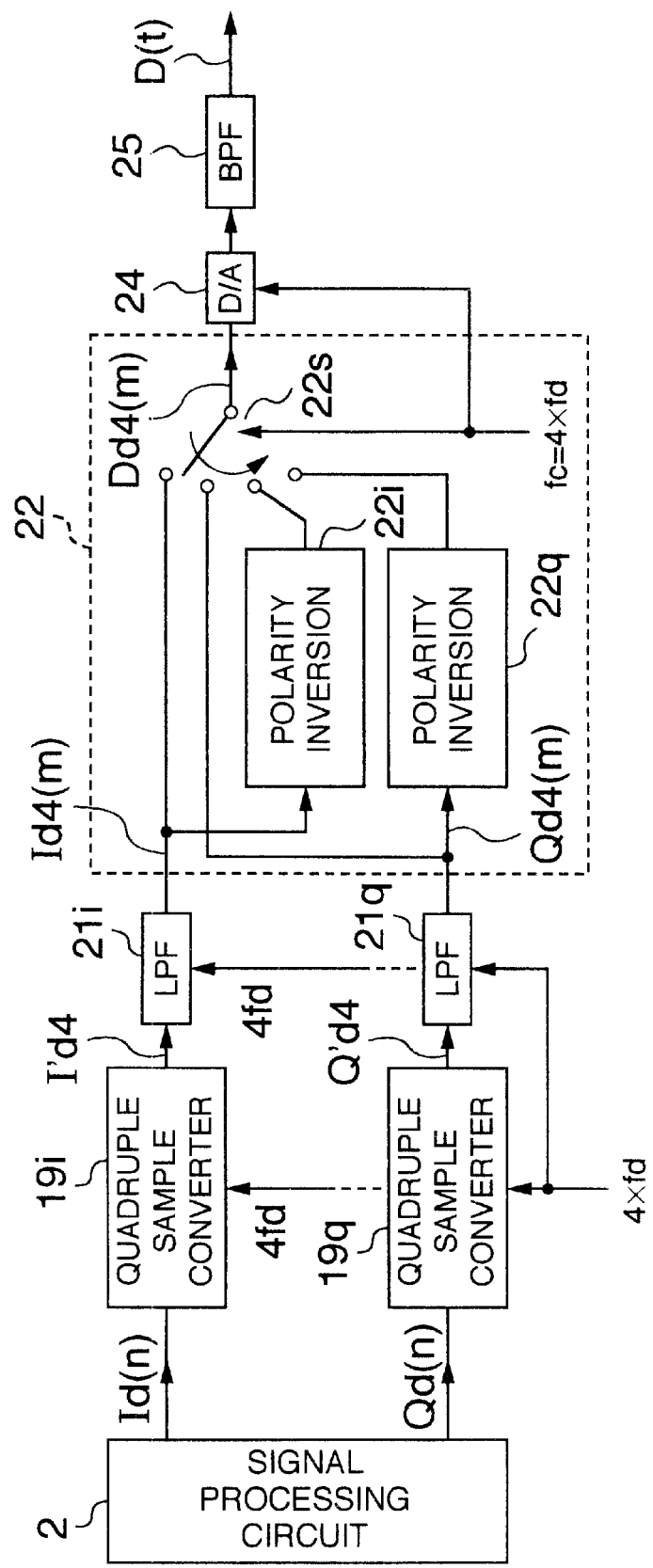
FIG. 21 is a block diagram showing an example of the orthogonal modulator having a digital configuration.

Specifically, in the patterns shown in FIGS. 2(a), (b) of the signals Id4(m), Qd4(m) output from the digital LPFs 21i, 21q of FIG. 21, the sample values indicated by thick arrows and values with the polarity inverted are alternately selected and output to perform the orthogonal modulation process. FIGS. 2(a), (b), (c) are the same as the waveform diagrams of FIGS. 23(e), (f), (g), respectively.

It should be noted here that the sampling values indicated by thin arrows in the pattern of FIGS. 2(a), (b) are not used at all for the orthogonal modulation process.

It follows therefore that in the digital LPFs 21i, 21q shown in FIG. 21, only the values at the sampling points indicated by thick arrows in FIGS. 2(a), (b) are calculated and output.

Figure 2:
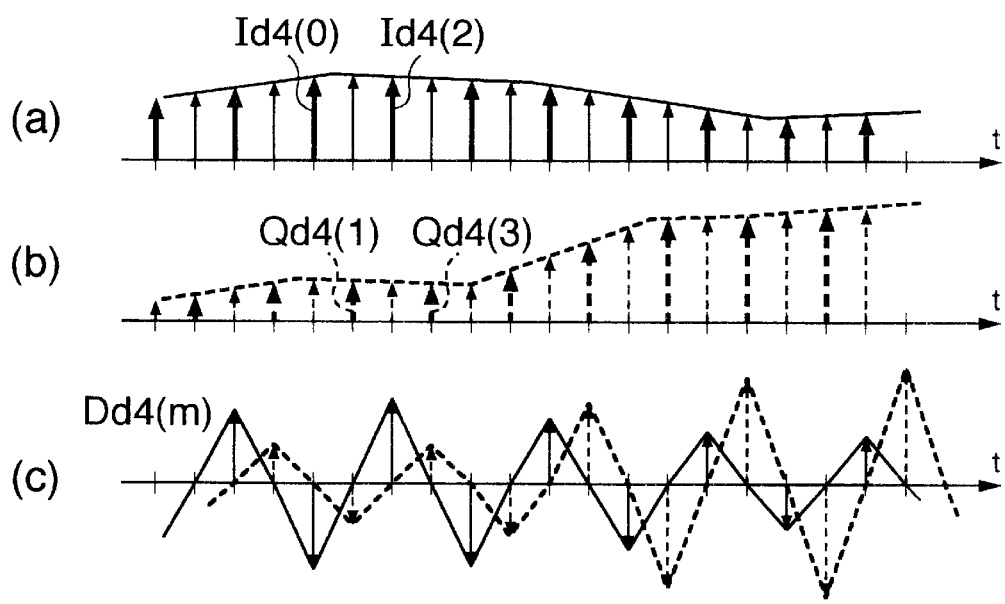
FIG. 2 is a signal waveform diagram for explaining the operation of the digital orthogonal modulator according to the first embodiment.
Figure 3:
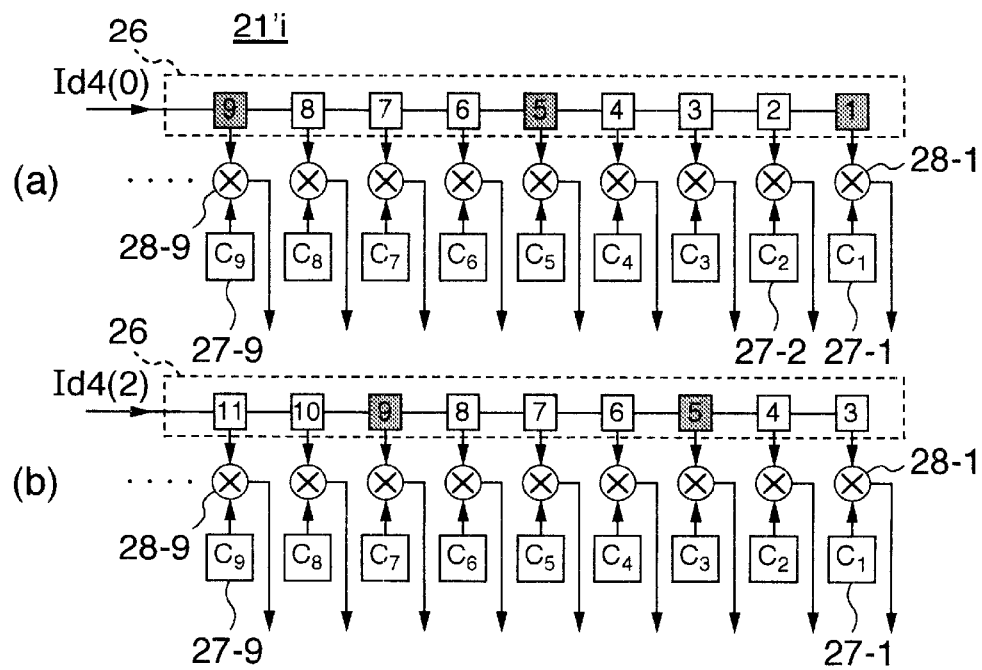
FIG. 3 is a model diagram for explaining the operating principle of one of the digital LPFs according to the first embodiment.

First, when calculating the value at a sampling point indicated by a thick arrow, or the value Id4(0) in FIG. 2(a), for example, the internal state of the shift register 26 in the digital LPF 21i is as shown in FIG. 3(a). In FIG. 3, the memories of the shift register 26 for storing the values other than zero inserted by the quadruple sample converter 19i are shadowed.

In similar manner, when determining the value at another sampling point indicated by thick arrow, or the value Id4(2), for example, the internal state of the shift register 26 is as shown in FIG. 3(*b*). Specifically, whatever signal is input to the shift register 26, the states of FIGS. 3(*a*), (*b*) are alternated.

Then, the tap coefficients $C_2$, $C_4$, $C_6$, ... $C_{EVEN}$ and so forth are multiplied by zero inserted in any of signal calculations. Actually, therefore, the multiplication between the signal value and the tap coefficient is not required. Thus, the multiplication between only the tap coefficients $C_1$, $C_3$, $C_5$, ... $C_{ODD}$ and so forth and the values on the shift register is required.

The same can be said of the signal Qd4(*m*) shown in FIG. 2(*b*).

Figure 4:
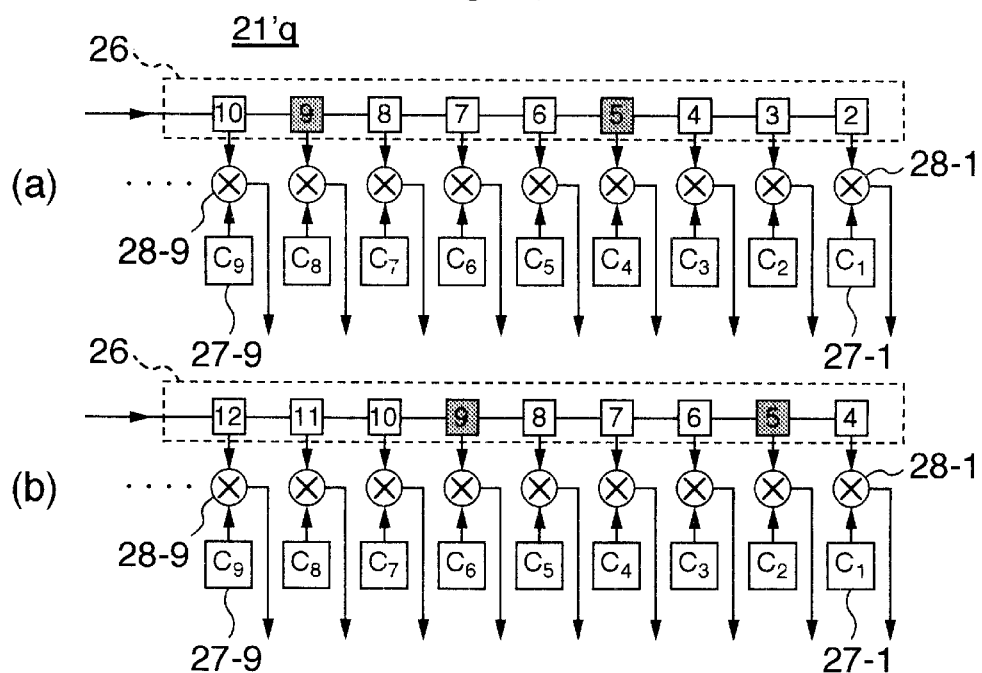
FIG. 4 is another model diagram for explaining the operating principle of the other digital LPF according to the first embodiment.

In the case of the signal Qd4(*m*), however, the positions of the sampling points indicated by thick arrows are displaced by one sampling point from those for the signal Id4(*m*). Therefore, when calculating the values at the sampling points indicated by thick arrows of FIG. 2(*b*), or the values of Qd4(1) and Qd4(3), for example, the internal state of the shift register 26 in the digital LPF 21*q* is as shown in FIGS. 4(*a*), (*b*).

Thus, in the case of the signal Qd4(*m*), only the tap coefficients $C_2$, $C_4$, $C_6$ and so forth are multiplied, as in the case of the tap coefficients $C_1$, $C_3$, $C_5$ and so forth for the signal Id4(*m*). In both calculations, the tap coefficients are not actually required to be multiplied with the signal value, since only zero inserted is multiplied. This indicates the possibility of reducing the number of multipliers.

Figure 1:
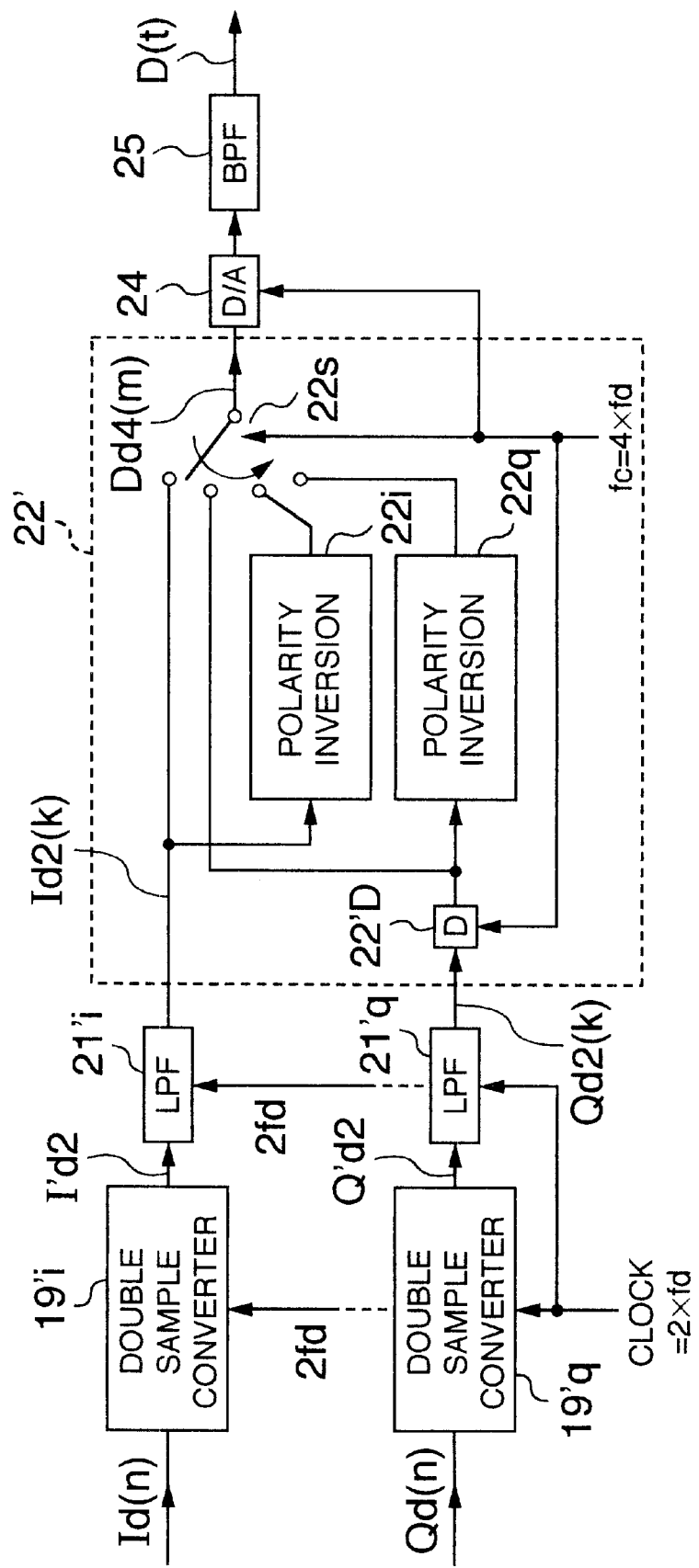
FIG. 1 is a block diagram showing an example of a digital orthogonal modulator according to a first embodiment of the invention.

FIG. 1 shows a digital orthogonal modulator according to the first embodiment of the invention configured based on the aforementioned recognition. The quadruple sample converters 19*i*, 19*q* in the digital orthogonal modulator of FIG. 21 are replaced by double sample converters 19'*i*, 19'*q*, the digital LPFs 21*i*, 21*q* are replaced by digital LPFs 21'*i*, 21'*q*, and the digital orthogonal modulation circuit 22 is replaced by a digital orthogonal modulation circuit 22'. The configuration of the remaining component parts remains the same as in FIG. 21.

Figure 5:
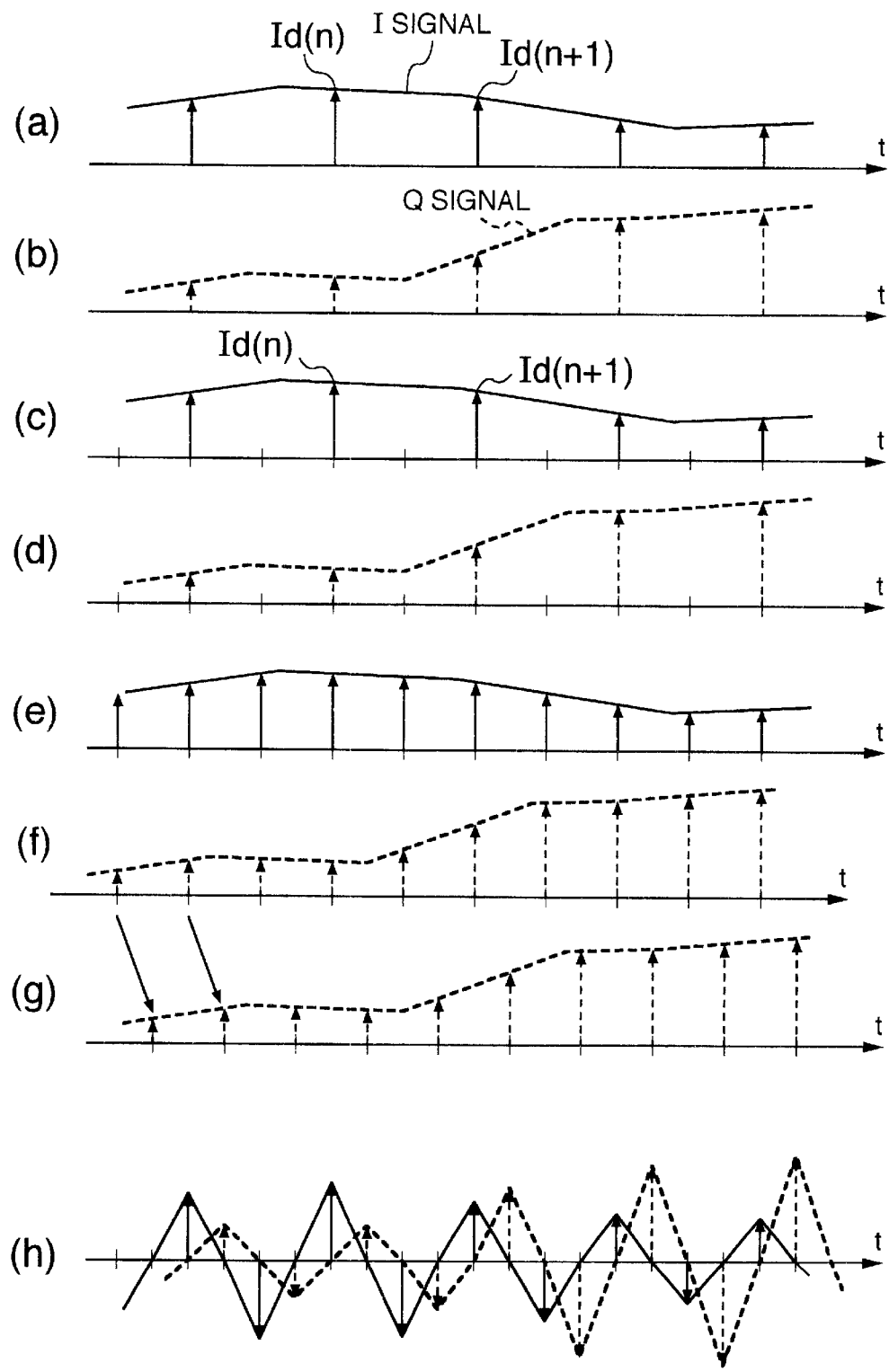
FIG. 5 is a signal waveform diagram for explaining the operation of the digital orthogonal modulator according to the first embodiment.

The double sample converters 19'*i*, 19'*q* are supplied with signals Id(n), Qd(n), respectively, of the sampling frequency fd, as shown in FIGS. 5(*a*), (*b*). The zero is inserted between the nth sampling value and the (n+1)th sampling value so that the signals Id(n), Qd(n) are converted into signals I'd2(*k*), Q'd2(*k*) having a double sampling frequency 2×fd.

The signal waveforms of the signals I'd2(*k*), Q'd2(*k*) thus converted are shown in FIGS. 5(*c*), (*d*), respectively.

Figure 6:
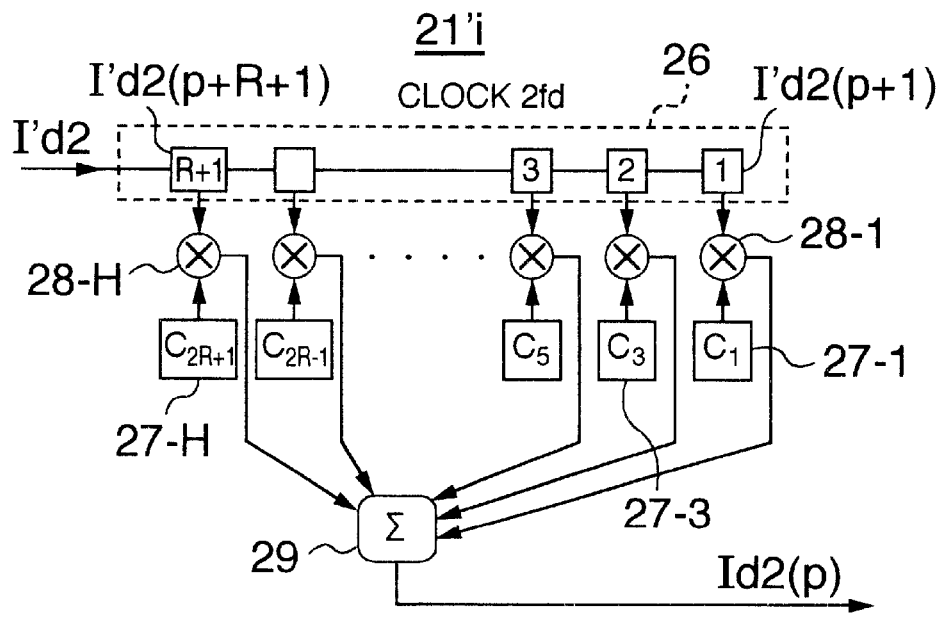
FIG. 6 is a block diagram showing an example of one of the digital LPFs according to the first embodiment.

Of these signals, first, the signal I'd2(*k*) is input to the digital LPF 21'*i*, and the operation of equation (8) below is executed for each clock pulse of the sampling frequency 2×fd.

$$Id2(p) = C_1 \times I'd2(p+1) + C_3 \times I'd2(p+2) + \qquad (8)$$
$$C_5 \times I'd2(p+3) + \ldots \ldots +$$
$$C_H \times I'd2(p+R+1)$$

where R is an arbitrary integer, and the number H of terms may be either an even or odd numbers. In this case, however, H is set to an odd number 2×R+1. Thus, the configuration of the digital LPF 21'*i* is as shown in FIG. 6.

The signal Q'd2(*k*), on the other hand, is input to the digital LPF 21'*q*, and the operation of equation (9) below is executed for each clock pulse of the sampling frequency 2×fd.

$$Qd2(p) = C_2 \times Q'd2(p+1) + C_4 \times Q'd2(p+2) + \qquad (9)$$
$$C_6 \times Q'd2(p+3) + \ldots \ldots +$$
$$C_{(H-1)} \times Q'd2(p+R)$$

Figure 7:
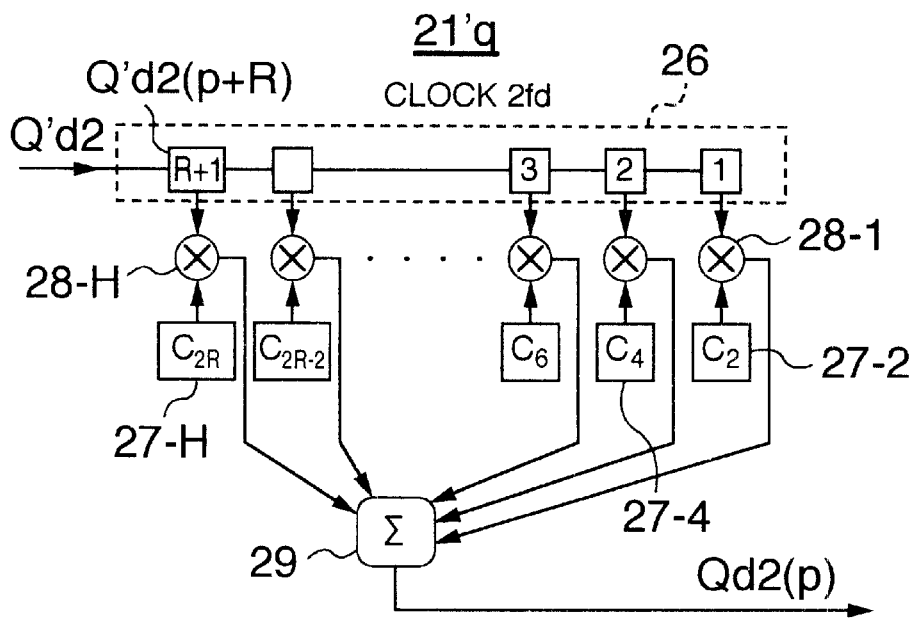
FIG. 7 is a block diagram showing an example of the other digital LPF according to the first embodiment.

Thus, the configuration of the digital LPF 21'*q* is as shown in FIG. 7.

As a result, the signals Id2(*k*), Qd2(*k*) output from the digital LPFs 21'*i*, 21'*q*, respectively, assume a waveform as shown in FIGS. 5(*e*), (*f*) or a sampling waveform with zeros inserted.

As clear from equations (8) and (9), each equation uses every other tap coefficient extracted from the series of coefficients $C_1$, $C_2$, ..., $C_H$ in equation (5). As a result, the number of multiplications is about one half that for equation (5).

Thus, according to this embodiment, the number of multiplier circuits of the digital LPFs 21'*i*, 21'*q*, as seen from FIGS. 6 and 7, is about one half that for the digital LPFs 21*i*, 21*q* of FIG. 21, respectively. In this way, the circuit size is remarkably reduced.

Figure 27A:
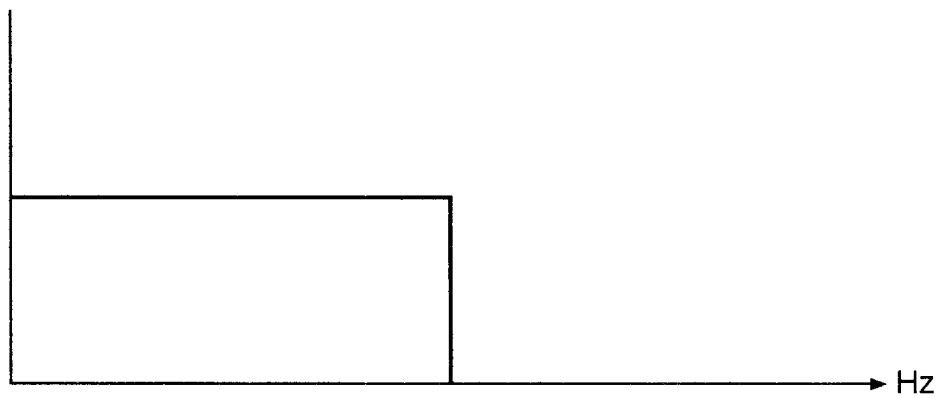
FIG. 27A is a graph showing the ideal frequency characteristic of the digital LPF.
Figure 27B:
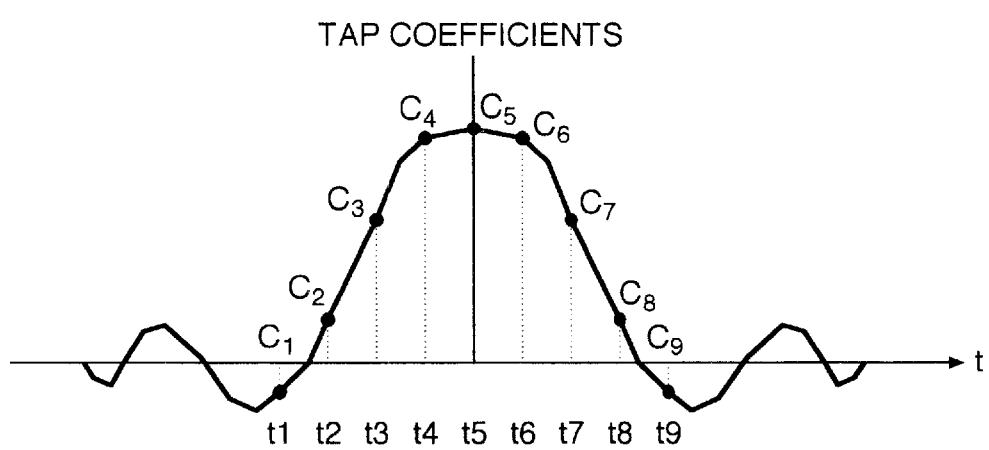
FIG. 27B shows an example of the impulse response curve of the digital LPF.

Equations (8) and (9) use different series of coefficients. Combining the coefficient series of equation (8) and the coefficient series of equation (9), therefore, can obtain the same coefficient series as equation (5). The two sets of coefficients give a series of values on a smooth impulse response curve, such as shown in FIG. 27B. Thus, the same performance is exhibited as in the case of FIG. 21 without any adverse effect which otherwise might be caused by the reduction in the number of multiplier circuits.

According to this embodiment, H is an odd number, and one of the digital LPF 21'*i* and the digital LPF 21'*q* has one more tap than the other.

In this case, the number of the tap coefficients $C_2$, $C_4$ and so forth required for determining the signal Qd2(*k*) in FIG. 5(*f*) is one tap more or less than the number of tap coefficients $C_1$, $C_3$ and so forth required for determining the signal Id2(*k*) of FIG. 5(*e*). For this reason, the signal waveform of FIG. 5(*f*) is displaced one clock pulse of the clock of the quadruple sampling frequency 4×fd forward of the signals indicated by thick arrows in FIG. 2(*b*).

In the digital orthogonal modulation circuit 22' according to this embodiment, therefore, as shown in FIG. 1, a delay circuit 22'D of one clock pulse is inserted. This delay circuit 22'D adjusts (delays) the timing of the signal Qd2(*k*) as shown in FIG. 5(*g*).

Figure 23:
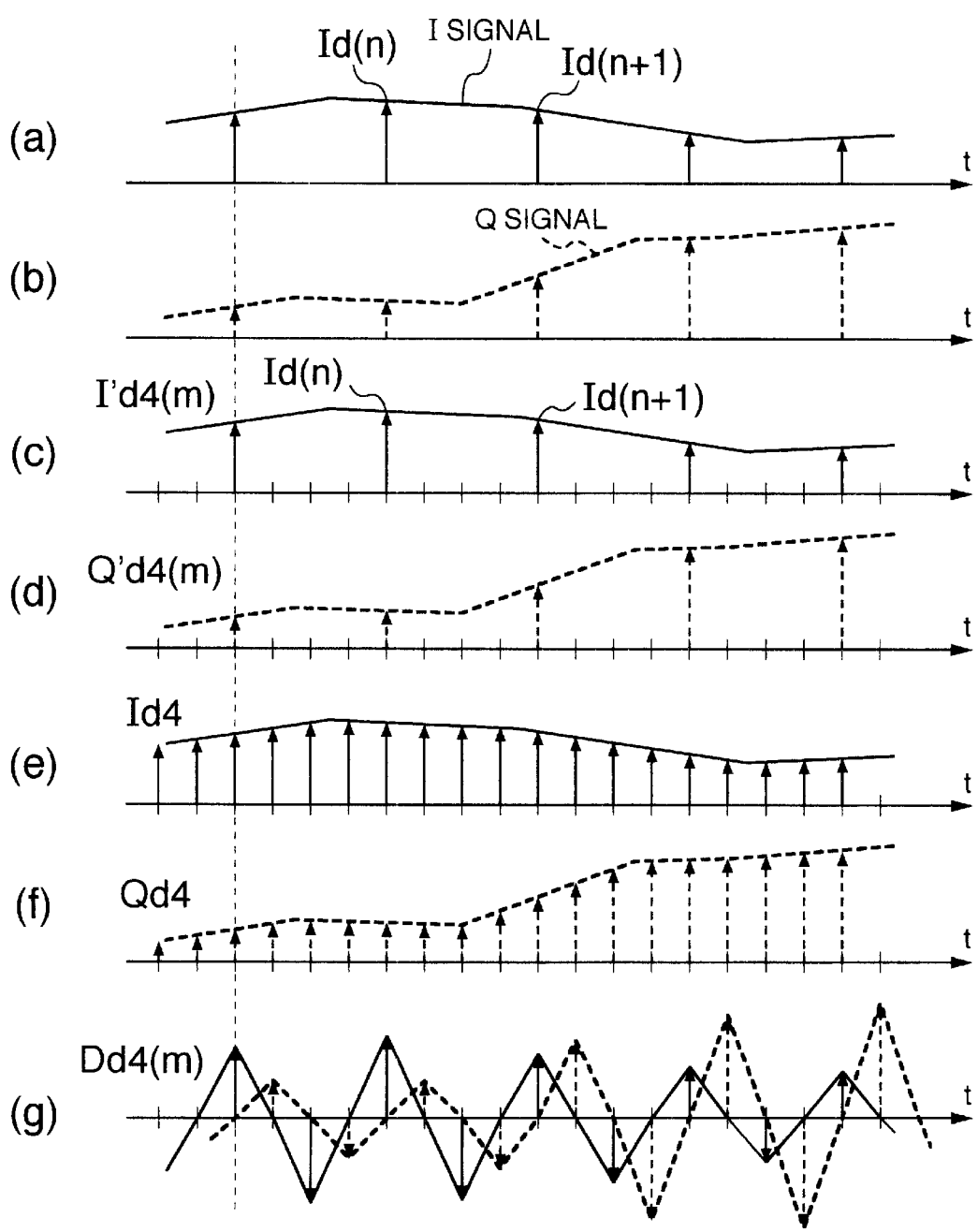
FIG. 23 is a signal waveform diagram for explaining the operation of the orthogonal modulator having a digital configuration.
Figure 24:
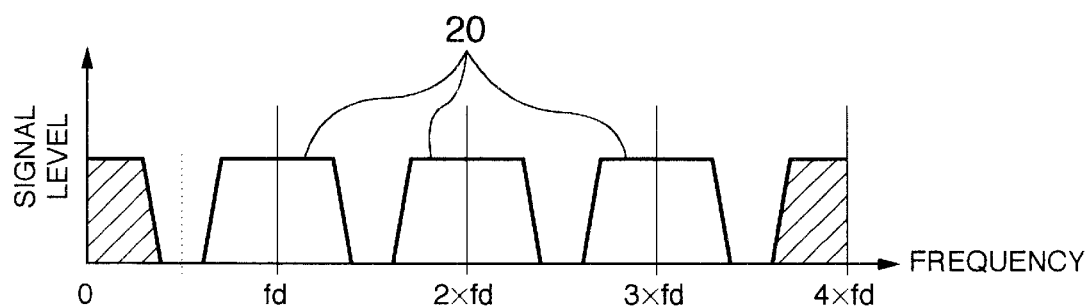
FIG. 24 is a model diagram for explaining the unrequited harmonic components generated by the digital orthogonal modulation.
Figure 25:
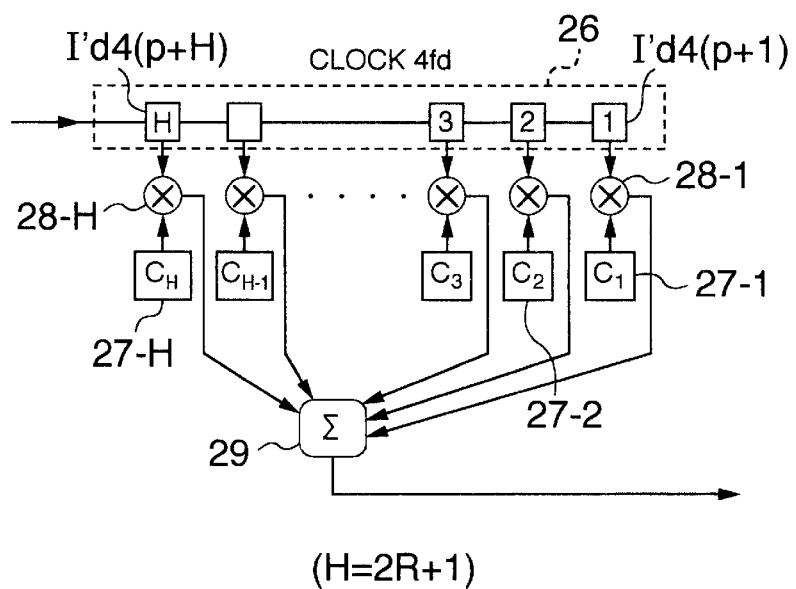
FIG. 25 is a block diagram showing an example of the digital LPF used for the digital orthogonal demodulator.

Thus, once the orthogonal modulation is carried out by the digital orthogonal modulation circuit 22', as shown in FIG. 5(*h*), the orthogonal modulation signal Dd4(*m*) having the same waveform as the one shown in FIG. 23(*g*) can be produced.

Figure 19:
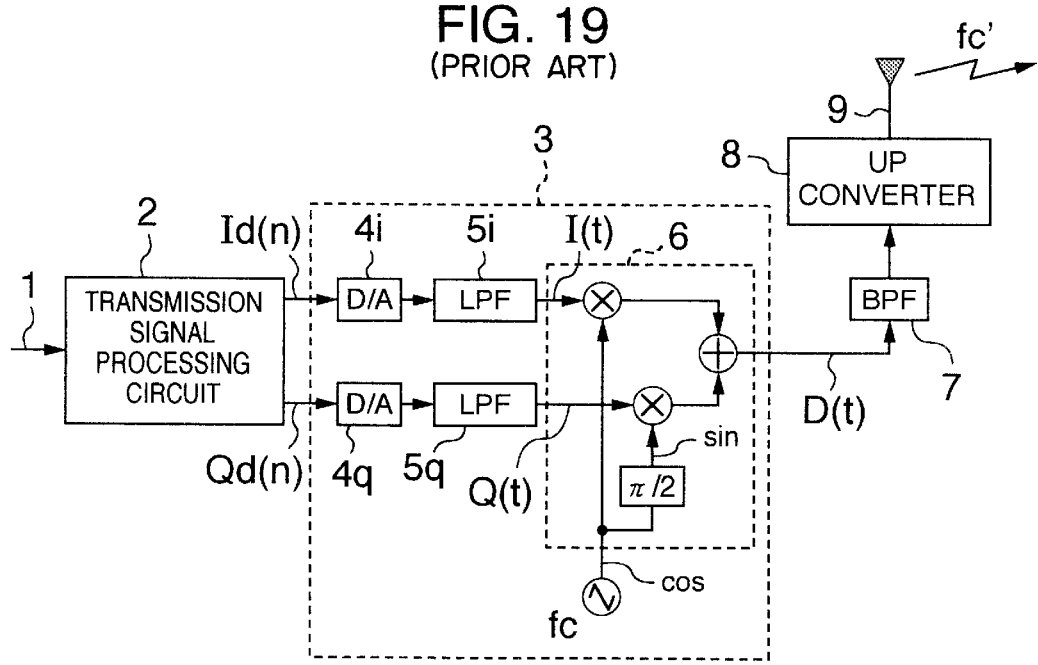
FIG. 19 is a block diagram showing an example of the transmission circuit including a digital orthogonal modulator according to the prior art.

The orthogonal modulation signal Dd4(*m*) output from the digital orthogonal modulation circuit 22' is converted into an analog signal by a D/A converter 24. The orthogonal modulation signal which is now an analog signal is band-limited by a BPF 25, and output from the digital orthogonal modulator as an orthogonal modulation signal D(t). The orthogonal modulation signal D(t) is supplied to an up converter 8 (FIG. 19).

According to the first embodiment shown in FIG. 1, as clear from FIGS. 6 and 7, the number of taps of the digital LPFs 21'*i*, 21'*q* is reduced to one half that of the digital LPFs 21$i$, 21$q$ used in the circuit of FIG. 21. In this embodiment, in spite of the fact that the circuit size of the digital LPF is remarkably reduced, the characteristic of the orthogonal modulation signal Dd4($m$) output remains the same as the characteristic of the orthogonal modulation signal Dd4($m$) for the circuit of FIG. 21.

In the process, the sampling frequency of the signal input to the digital LPFs 21'$i$, 21'$q$ is one half that for the circuit of FIG. 21. Therefore, the clock frequency of the drive pulse can also be reduced to one half. On the other hand, the multiplier circuit requires repeating a large number of addition operations for obtaining the multiplication result. By this reason, it is practically very difficult to make a high speed digital filter circuit in the orthogonal modulator. However, according to the embodiment of the present invention, the multiplier circuit can be operated in relatively low speed with a low frequency clock signal, and then digital filter can be easily realized in the orthogonal modulator.

Thus, in the digital orthogonal modulator according to the first embodiment which has the same function and performance as the circuit of FIG. 21, the required number of taps of the digital LPF can be reduced by about one half, and therefore the circuit size of the transmission circuit can be remarkably reduced.

At the same time, the operating speed of the multiplier circuits can be reduced to one half, and therefore the multiplier circuits can be easily fabricated. Consequently, it is possible to produce a digital signal transmission system which is inexpensive and easy to manufacture.

In the first embodiment, an explanation was made about the case in which the number H of taps of the digital LPF is an odd number 2×R+1. The first embodiment, however, can be executed also when the number of taps is an even number H=2×R.

In the latter case, the two digital LPFs 21'$i$, 21'$q$ have the same number of taps without posing any problem.

Now, the digital orthogonal demodulator on the receiving side according to the second embodiment of the invention will be explained.

In this case, too, to assure full understanding of the operating principle of the invention, the digital orthogonal demodulator shown in FIG. 22 will be explained first.

Figure 9:
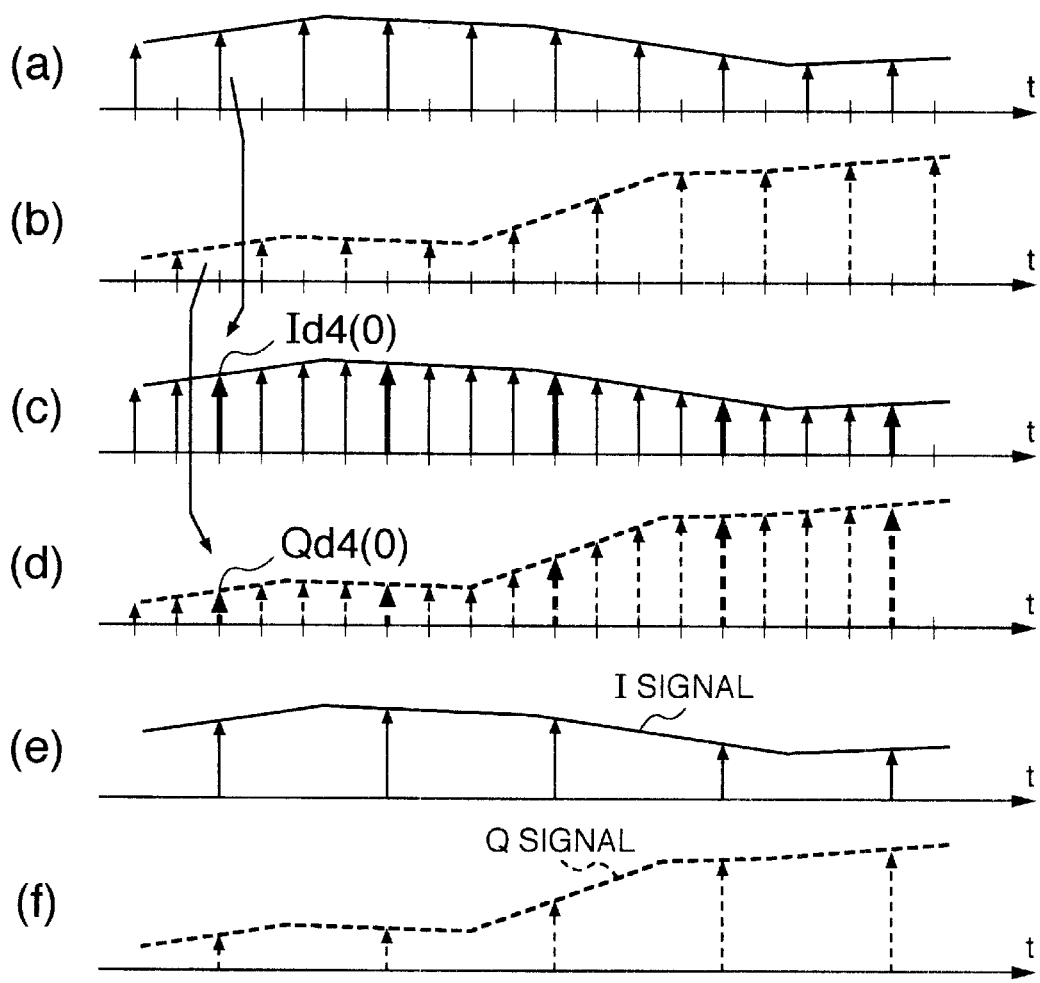
FIG. 9 is a signal waveform diagram for explaining the operation of the digital orthogonal demodulator according to the second embodiment.
Figure 22:
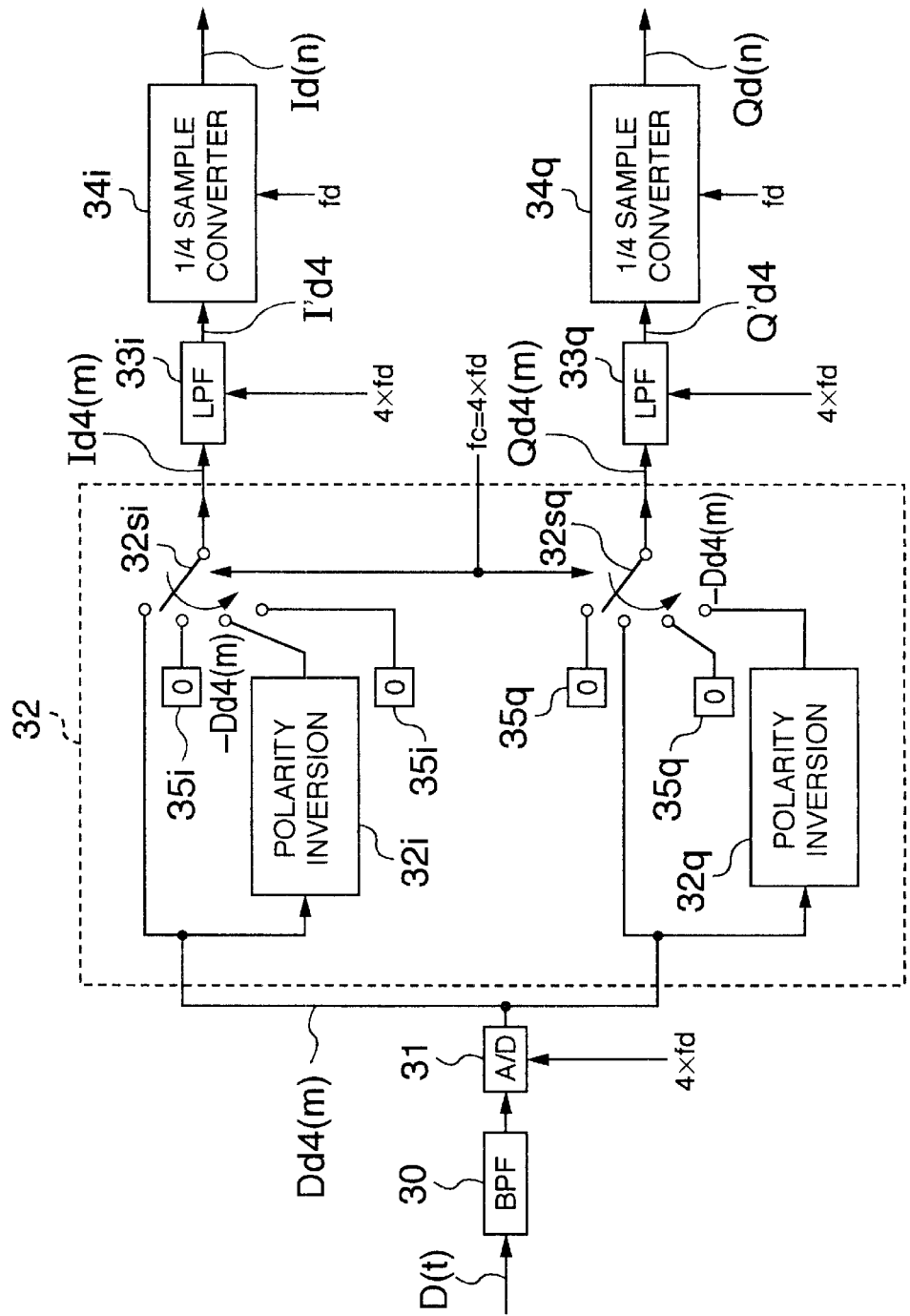
FIG. 22 is a block diagram showing an example of the orthogonal demodulator having a digital configuration.
Figure 26:
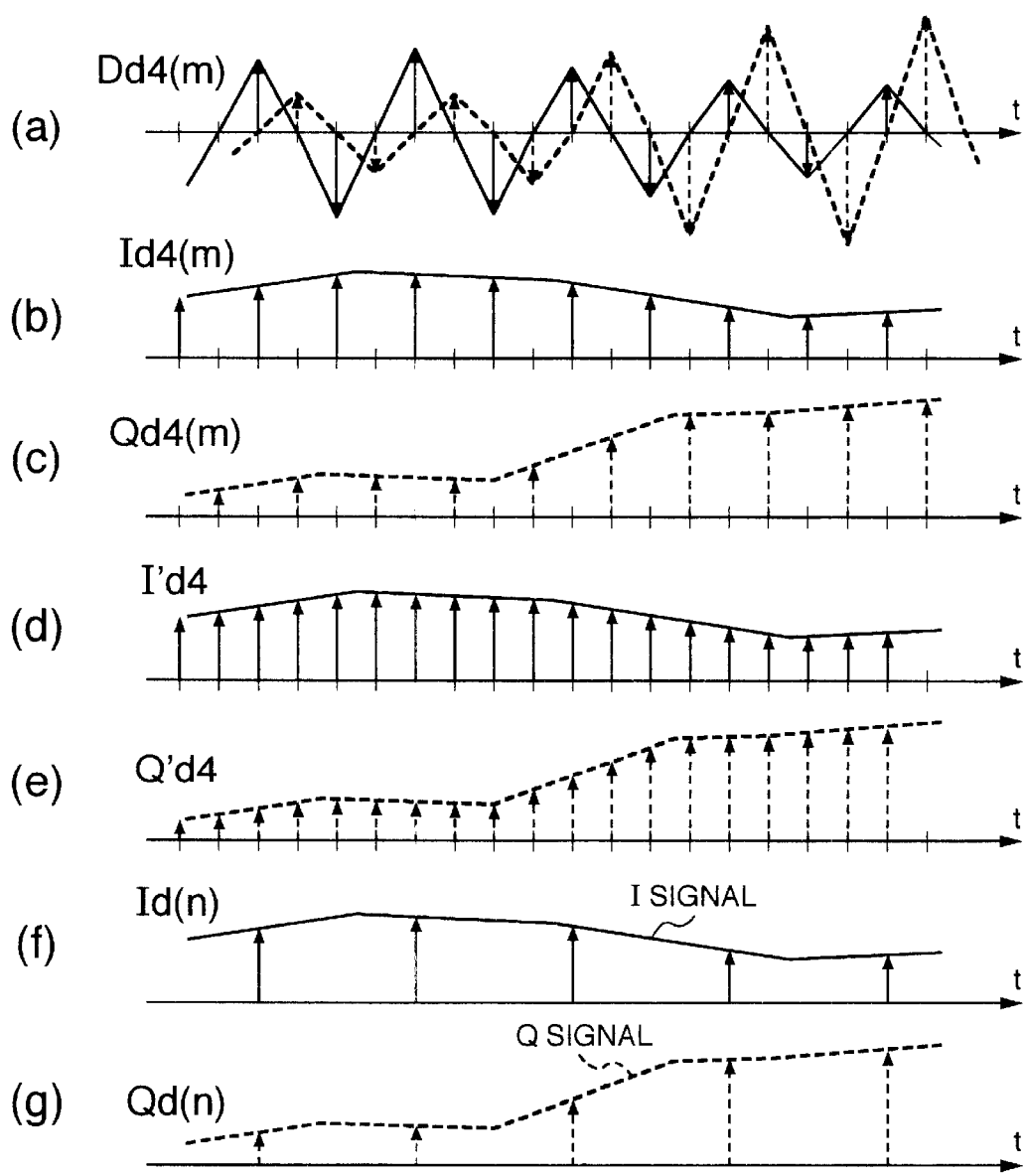
FIG. 26 is a signal waveform diagram for explaining the operation of the orthogonal demodulator having a digital configuration.

As described above, the signals Id4($m$), Qd4($m$) output from the digital LPFs 33$i$, 33$q$ of the demodulator shown in FIG. 22 are supplied to the 1/4 sample converters 34$i$, 34$q$, respectively, where the sampling values indicated by thick arrows in FIGS. 9($c$), ($d$) are sequentially selected and output as orthogonal demodulation signals Id($n$), Qd($n$). FIGS. 9($a$) to 9($f$) show the same waveforms as FIGS. 26($b$) to 26($g$), respectively.

First, as in the foregoing case, it should be noted that the sampling values indicated by thin arrows in the waveform diagram of FIGS. 9($c$), ($d$) are not used at all. Thus, in the digital LPFs 33$i$, 33$q$, only the values at the sampling points indicated by thick arrows in FIGS. 9($c$), ($d$) are actually calculated and output.

Figure 10:
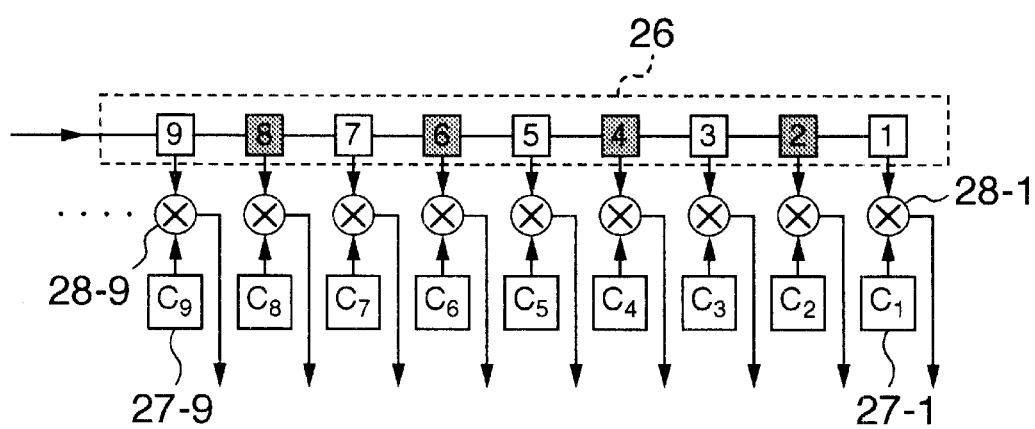
FIG. 10 is a model diagram for explaining the operating principle of the digital LPF according to the second embodiment.

When calculating the value at a sampling point indicated by thick arrow, or the value of Qd4(0), for example, in FIGS. 9($c$), ($d$), the internal state of the shift register 26 in the digital LPF 33$q$ is as shown in FIG. 10. In this case, too, as in the case of FIG. 3, the memories storing the values other than zero inserted are shadowed.

The tap coefficients $C_1$, $C_3$, $C_5$, and so forth are multiplied by zero inserted, and therefore need not actually be multiplied by the signal value. In other words, the insertion of zero values in the digital orthogonal demodulation circuit 32 is not required, but only the tap coefficients $C_2$, $C_4$, $C_6$ and so forth can be multiplied.

This is also the case with the signal Id4($m$) of FIG. 9($c$).

Figure 11:
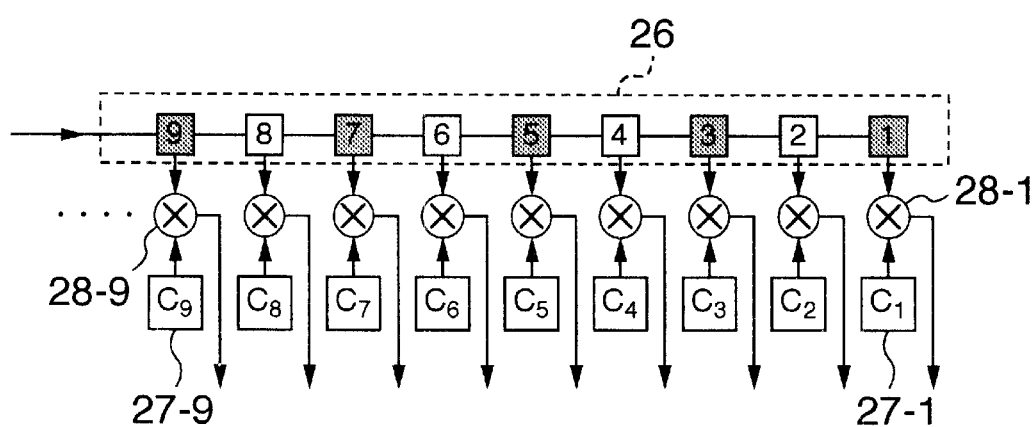
FIG. 11 is another model diagram for explaining the operating principle of the digital LPF according to the second embodiment

In the case of the signal Id4($m$), however, the positions of the sampling points assuming a value other than zero are displaced in timing by one sampling point from those for the signal Qd4($m$). Therefore, when calculating the value at a sampling point indicated by thick arrow in FIG. 9($c$), or the value Id4(0), for example, the shift register 26 in the digital LPF 33$i$ assumes the internal state as shown in FIG. 11.

Thus, in processing the signal Id4($m$), the tap coefficients $C_1$, $C_3$, $C_5$ and so forth not used for processing the signal Qd4($m$) are used. For the tap coefficients $C_2$, $C_4$, $C_6$ and so forth used for processing the signal Qd4($m$), however, zero is multiplied, and therefore, the multiplication of the signal value and the tap coefficients is not actually required.

In the case of the signal Id4($m$) in FIG. 9($c$), the values at the sampling points indicated by thick arrows already exist in the signal of FIG. 9($a$), and the LPF for interpolating the values at the positions of zero value appears to be unnecessary.

After orthogonal demodulation, however, the frequency characteristics of the signal Id($n$) and the signal Qd($n$) are required to be identical to each other. For this purpose, the digital LPF 33$i$ having the same characteristic as the digital LPF 33$q$ is used to secure the same frequency characteristic of the two types of signals.

The second embodiment of the present invention is configured based on the foregoing recognition. Now, a circuit configuration of the digital orthogonal demodulator according to this embodiment will be explained with reference to FIG. 8.

Figure 8:
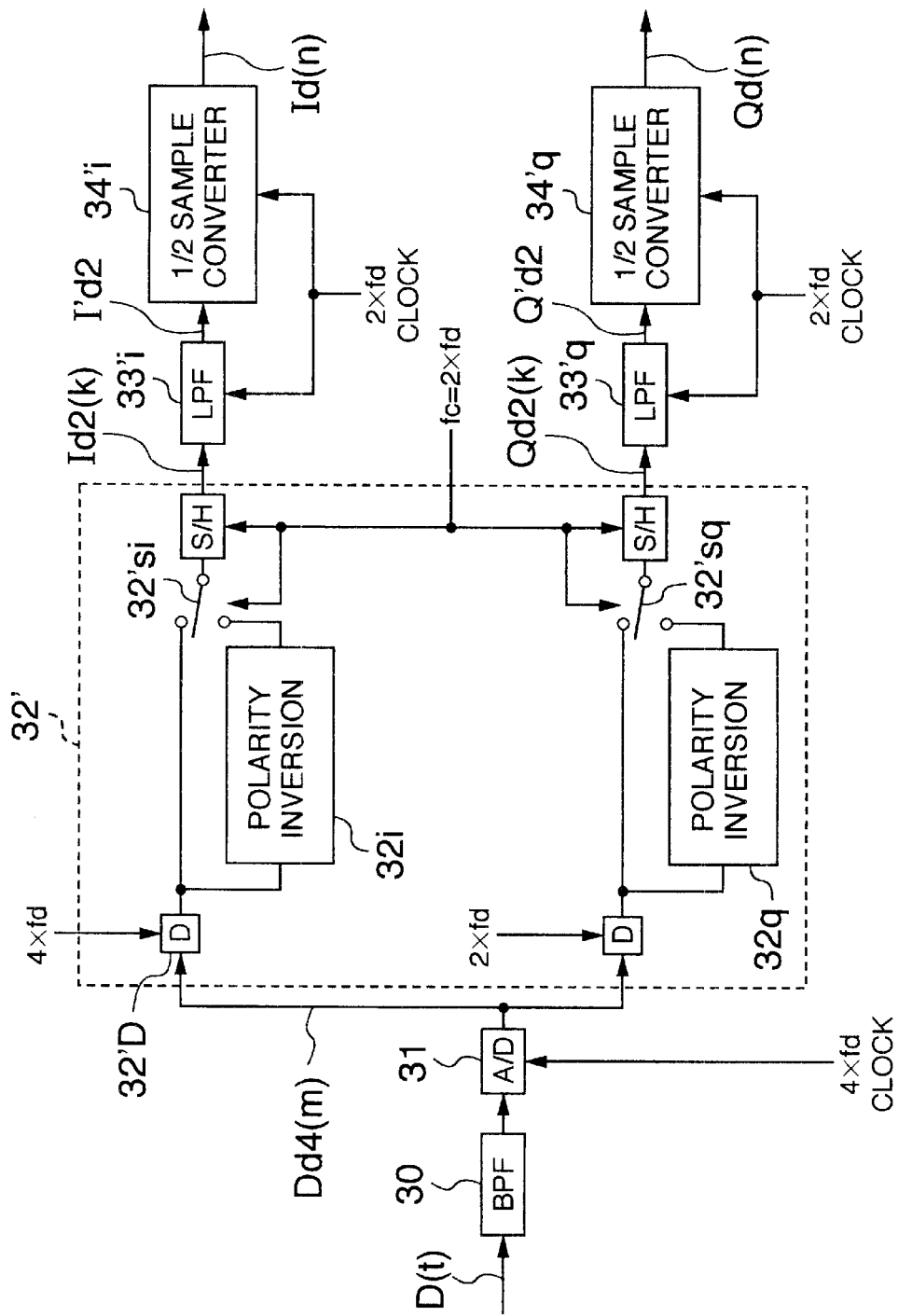
FIG. 8 is a block diagram showing an example of the digital orthogonal demodulator according to a second embodiment of the invention.

The digital orthogonal demodulator shown in FIG. 8 includes a digital orthogonal demodulation circuit 32' in place of the digital orthogonal demodulation circuit 32 in the digital orthogonal demodulator of FIG. 22, digital LPFs 33'$i$, 33'$q$ in place of the digital LPFs 33$i$, 33$q$, and 1/2 sample converters 34'$i$, 34'$q$ in place of the 1/4 sample converters 34$i$, 34$q$. The configuration of the other component parts is basically the same as that of the corresponding ones in FIG. 22.

Figure 14:
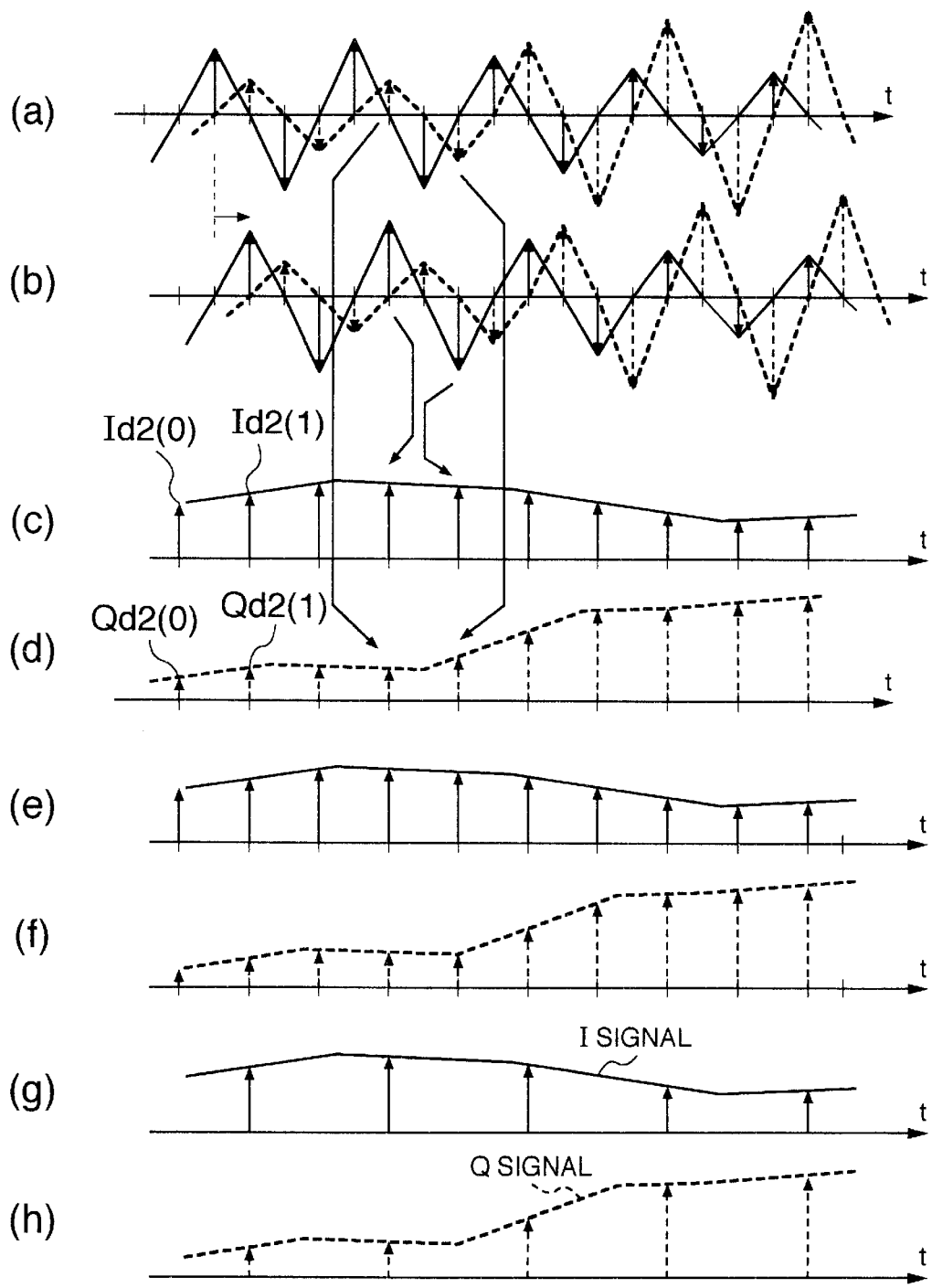
FIG. 14 is a signal waveform diagram for explaining the operation of the digital orthogonal demodulator according to the second embodiment.

The signal Dd4($m$) of FIG. 14($a$) output from the A/D converter 31 is separated into two routes before being input to the digital orthogonal demodulation circuit 32'.

In one of the routes, the signal is delayed by one clock of the sampling frequency 4×fd in a delay circuit 32'D and output as a delay signal shown in FIG. 14($b$).

The signal not delayed shown in FIG. 14($a$), the delayed signal of FIG. 14($b$), and the signals of the inverted polarities thereof, i.e. a total of four types of signals are sequentially sampled by switches 32'si, 32'sq operating at the frequency 2×fd, and thus converted into the signal Id2($k$) shown in FIG. 14($c$) and the signal Qd2($k$) shown in FIG. 14($d$), respectively. In the diagrams, characters S/H designate a sample-and-hold circuit.

Then, first among these signals, the signal Id2($k$) is input to the digital LPF 33'$i$, in which it is processed for each clock pulse of the sampling frequency 2×fd according to equation (10) below and assumes the signal I'd2($k$) shown in FIG. 14($e$).

$$I'd2(p) = C_1 \times Id2(p+1) + C_3 \times Id2(p+2) + \qquad (10)$$
$$C_5 \times Id2(p+3) + \ldots \ldots +$$

-continued $$C_H \times Id2(p + R + 1)$$

In equation (10), the number H of terms may be either odd or even. In this case, however, an odd number H=2·R+1 is employed, and therefore the digital LPF 33'$i$ assumes the configuration shown in FIG. 12.

The signal Qd2($k$), on the other hand, is input to the digital LPF 33'$q$ and, by being processed for each clock pulse at the sampling frequency 2×fd according to equation (11) below, converted into the signal Q'd2($k$) shown in FIG. 14(*f*).

$$Q'd2(p) = C_2 \times Qd2(p+1) + C_4 \times Qd2(p+2) + \quad (11)$$
$$C_6 \times Qd2(p+3) + \ldots \ldots +$$
$$C_{(H-1)} \times Qd2(p+R)$$

Figure 13:
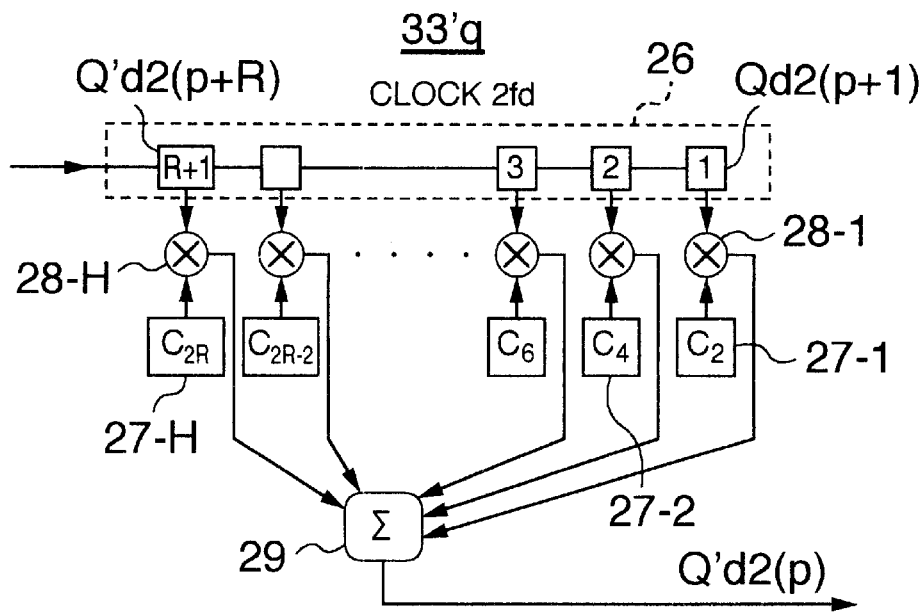
FIG. 13 is a block diagram showing an example of the other digital LPF according to the second embodiment.

Thus, the digital LPF 33'$q$ assumes the configuration shown in FIG. 13.

In both of these arithmetic operations, as clear from equations (10) and (11), every other tap coefficient is extracted from a series of the coefficients $C_1, C_2, \ldots, C_H$ of equation (5). According to this embodiment, therefore, the number of multiplications is about one half smaller than that for equation (5).

Also, in equations (10) and (11), different series of coefficients are used from each other. When the series of coefficients of equation (10) is combined with that of equation (11), therefore, the same series of coefficients is obtained as that of equation (5).

When H is an odd number as in this embodiment, one of the digital LPF 33'$i$ and the digital LPF 33'$q$ has one more tap than the other.

Figure 20:
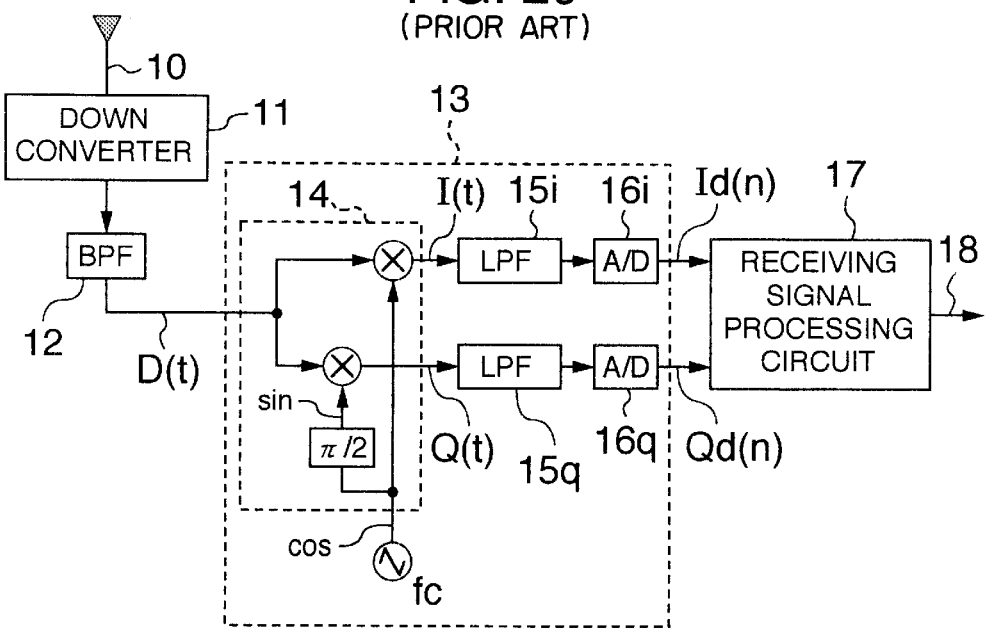
FIG. 20 is a block diagram showing an example of the receiving circuit including a digital orthogonal demodulator according to the prior art.

The signal I'd2($k$) and the signal Q'd2($k$) output from the digital LPFs 33'$i$, 33'$q$, respectively, are sampled at the frequency 2×fd in 1/2 sample circuits 34'$i$, 34'$q$, respectively. The resulting orthogonal demodulation signals Id(n), Iq(n) of a still lower sampling frequency fd produced by the 1/2 sample circuits are converted into analog signals and supplied to a receiving signal processing circuit 17 (FIG. 20). In the process, the orthogonal demodulation signals Id(n), Iq(n) assume the signal waveforms shown in FIGS. 14(*g*), (*h*), respectively.

Also according to this embodiment, an explanation was made about the case in which the number H of taps of the digital LPF is an odd number given by 2·R+1. Nevertheless, the embodiment can be executed with an even number of taps, i.e. H=2×R. In such a case, the number of taps is the same for the two digital LPFs 33'$i$, 33'$q$, which poses no problem.

Figure 12:
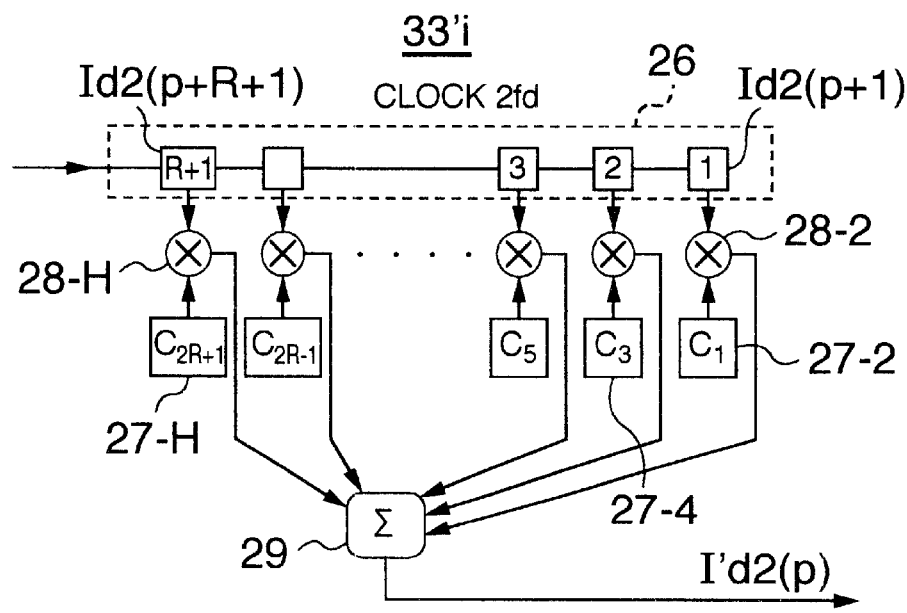
FIG. 12 is a block diagram showing an example of one of the digital LPFs according to the second embodiment.

According to the eighth embodiment of FIG. 8, as seen from FIGS. 12 and 13, the number of taps of the digital LPFs 33'$i$, 33'$q$ can be reduced to one half that for the digital LPFs 33$i$, 33$q$ used in the circuit of FIG. 22. In spite of this, the characteristic and hence the performance of the output orthogonal demodulation signals Id(n), Qd(n) remains exactly the same as that of the signal output from the circuit of FIG. 22.

In addition, the sampling frequency of the signal input to the digital LPF is reduced to one half, and therefore the clock frequency of the drive pulse can also be reduced by one half.

Consequently, in the digital orthogonal demodulator according to the second embodiment having the same function and the same performance as the circuit of FIG. 22, the required number of taps of the digital LPF can be reduced remarkably, and therefore the circuit size of the transmission is also reduced. Further, the multiplier circuit not good at the high-speed operation can be reduced to about one half in operating speed. As a result, a digital signal transmission system easy to manufacture and inexpensive can be readily produced.

Now, third to fifth embodiments of the invention will be explained.

The embodiments described below represent a method of further reducing the number of multiplier circuits required for the digital LPFs 21'$i$, 21'$q$, 33'$i$, 33'$q$ in the embodiments of FIGS. 1 and 8. The configuration of the component parts other than the digital LPF remains the same as that of the above-mentioned embodi- ments. Therefore, the configuration of the digital LPFs will be mainly explained below.

First, the third embodiment will be described.

Before entering the detailed explanation, the concept of the digital LPF used in the third embodiment will be explained. In this case, a filter having the characteristic expressed by equation (5) having the series of coefficients symmetric about the center coefficient is designed.

Specifically, the filter is designed to hold the relations $C_1=C_H$, $C_2=C_{H-1}$, $C_3=C_{H-2}$, $\ldots$, $C_n=C_{H-(n-1)}$ among the coefficients.

In the case where the number H of terms is odd and 2·R+1, however, only the coefficient $C_{R+1}$ has no corresponding coefficient.

In equation (8), on the other hand, every other coefficient $C_1, C_3, C_5, \ldots, C_H$ is extracted from the coefficients $C_1, C_2, C_3, C_4, C_5$ and so forth of equation (5). Therefore, the same relations of $C_1=C_H$, $C_3=C_{H-2}$ and so forth are maintained also among the coefficients extracted. Thus, a filter having symmetric coefficients can be produced. In similar manner, the coefficients extracted according to equation (9) can produce a filter having symmetric coefficients.

Figure 15A:
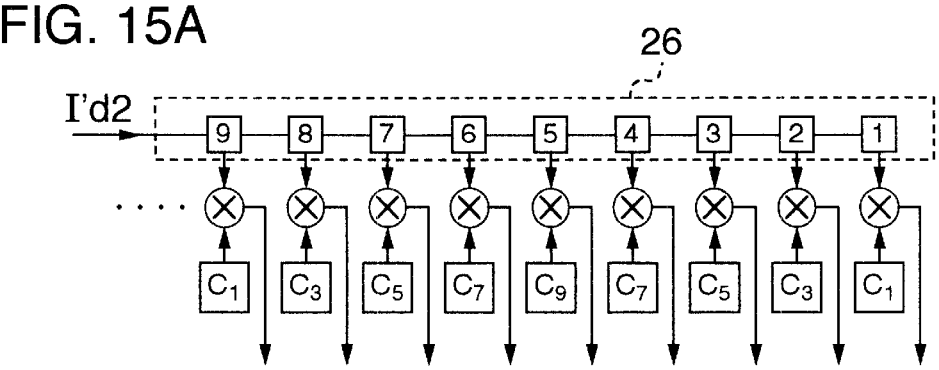
FIG. 15A is a model diagram for explaining the operating principle of the digital LPF according to a third embodiment of the invention.

Such a filter having symmetric coefficients can be illustrated as shown in FIG. 15A.

Figure 15B:
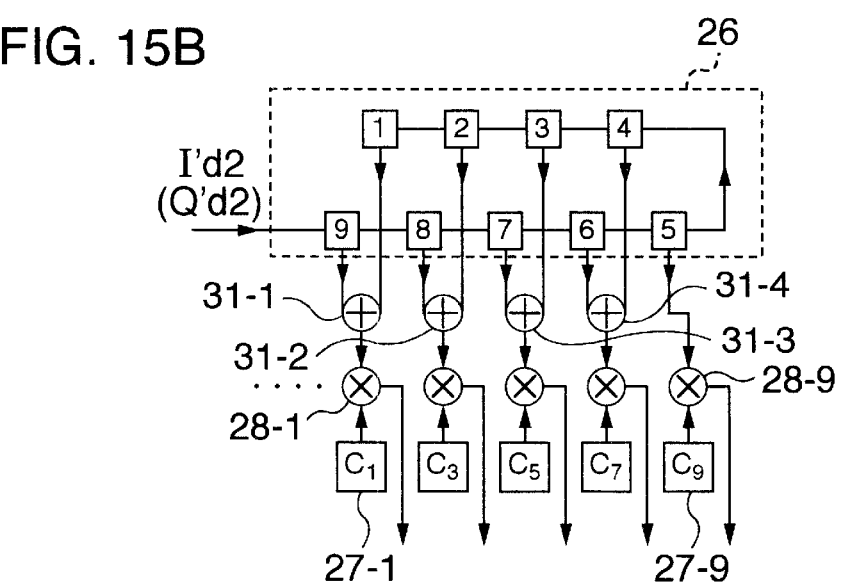
FIGS. 15B and 15C are block diagrams showing an example of the digital LPF according to the third embodiment of the invention.
Figure 15C:
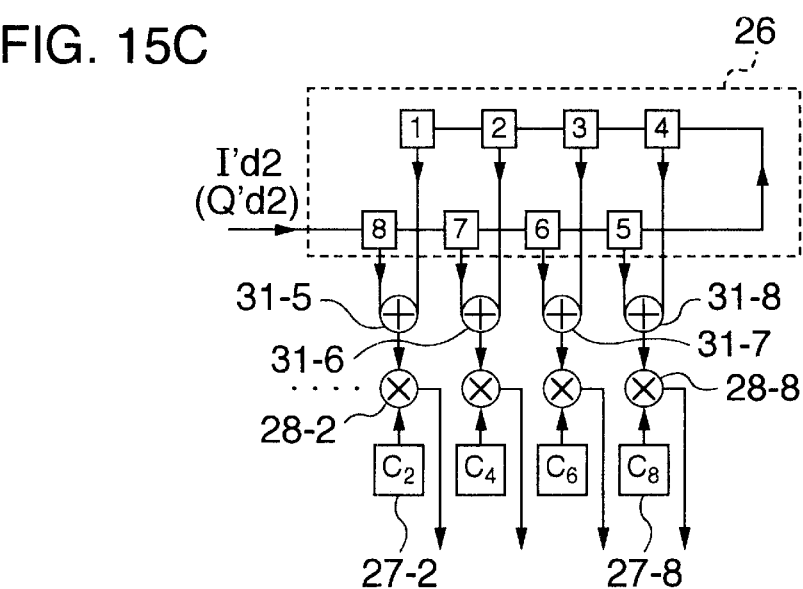

In the filter having symmetric coefficients as shown in FIG. 15A, the shift registers included in the digital LPF are arranged not simply forwardly but reversed from an intermediate point as shown in FIG. 15B or FIG. 15C. Further, adder circuits 31-1 to 31-4 are inserted for adding the signal values returned and the signal values newly input, and the resulting sum is multiplied by a common coefficient in the multiplier circuits 28-1 to 28-9. In this way, too, the digital LPF can be configured.

The third embodiment of the invention, therefore, uses a digital LPF having the circuit configuration as shown in FIGS. 15B and 15C.

When the number H of taps is odd, the number of taps of one of the two series of tap coefficients is also odd, and therefore a circuit configuration as shown in FIG. 15B is obtained. For the other series having an even number of taps, on the other hand, as shown in FIG. 15C, the circuit configuration is such that the coefficients are reversed from midway.

In the digital LPF having a circuit configuration shown in FIGS. 15B and 15C, therefore, the number of multiplier circuits can be further reduced by one half from that for the digital LPFs shown in FIGS. 6, 7, 12, 13. As a result, as compared with the digital LPF used in the circuits of FIGS. 21, 22, the total number of multiplier circuits can be reduced to one fourth.

According to the embodiment shown in FIGS. 15B, 15C, the adder circuits 31-1 and so forth are required. Since the adder circuit has a considerably simpler circuit configuration than the multiplier circuit, however, the increase in the circuit size by the adder circuits poses no substantial problem.

According to the third embodiment using the digital LPF having the circuit configuration shown in FIGS. 15B, 15C, therefore, there is provided a transmission system having a further reduced circuit size while having the same function and performance as the circuits of FIGS. 21, 22.

Now, a fourth embodiment of the invention will be explained.

The concept of the digital LPF according to the fourth embodiment is to reduce the number of multiplier circuits taking advantage of the fact that the signals input to the digital LPF, i.e. the signals shown in FIGS. 5(c), (d) still contain sampling points of zero value.

Figure 16A:
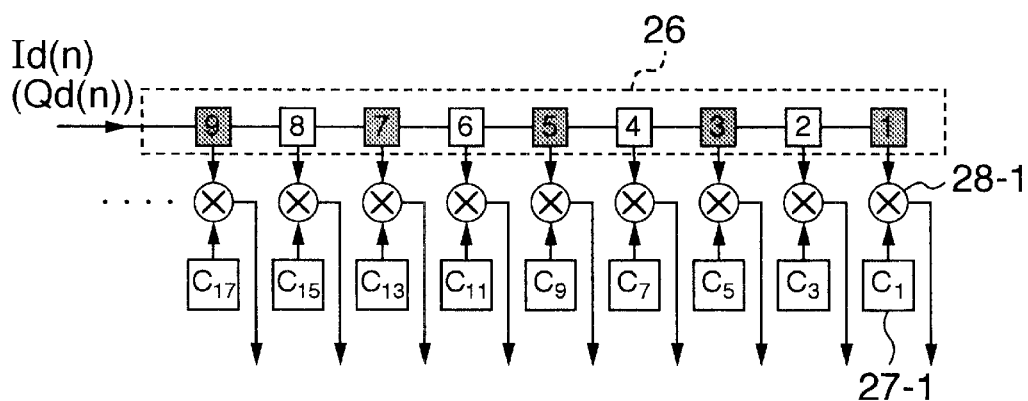
FIG. 16A is a model diagram for explaining the operating principle of the digital LPF according to a fourth embodiment of the invention.

FIG. 16A shows a typical state of the shift register in the digital LPF when the signal of FIG. 5(c) is input thereto. As described above, in FIG. 16A, the memories other than shadowed simply store zero regard- less of whatever signals are input, and therefore are not actually required to carry out the multiplication.

According as the signal is transferred in the shift register 26, one series of coefficients $C_1$, $C_5$, $C_9$ and so forth and the other series of coefficients $C_3$, $C_7$, $C_{11}$, and so forth are alternately multiplied by the signal values of the memories shadowed.

Figure 16B:
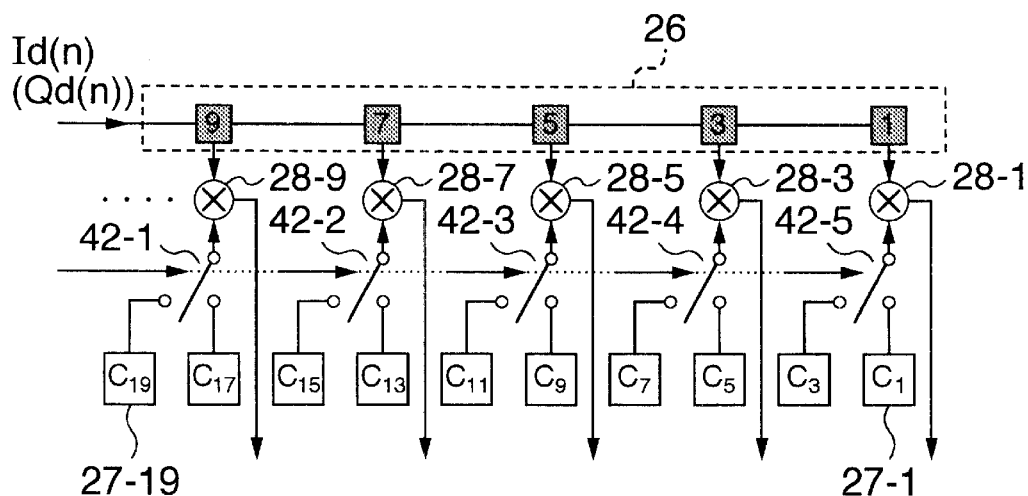
FIG. 16B is a block diagram showing an example of the digital LPF according to the fourth embodiment of the invention.

In the digital LPF according to the fourth embodiment, therefore, as shown in FIG. 16B, every other memory of the shift register 26 is removed. Further, one series of tap coefficients and the other series of tap coefficients are switched by switches 42-1 to 42-5. Thus, the switches 42-1 and so forth are operated in synchronism with the signal shift in the shift register 26.

At the same time, the process of inserting zero values in the input signal is eliminated, so that the signals Id(n), Qd(n) are input directly to the LPF. Specifically, the double sample converters 19'$i$, 19'$q$ of FIG. 1 are eliminated.

Each time a new signal value is input and the signal is shifted by one memory in the shift register 26, the switches 42-1 and so forth are operated while suspending the shifting, thereby multiplying the signals of the memories by the two series of coefficients. This switching operation exhibits substantially the same function as the double sampling.

According to the fourth embodiment, therefore, the number of multiplier circuits of the digital LPF can be further reduced by one half that of the digital LPF of the first embodiment.

In other words, according to the fourth embodiment, while maintaining the same function and performance as the circuit of FIG. 21, the number of multiplier circuits of the digital LPF can be reduced as remarkably as to one fourth, so that the circuit size of the digital signal transmission system can be correspondingly reduced.

Now, a fifth embodiment of the invention will be explained. In the fifth embodiment, among the digital LPFs of the third embodiment, the number of the multiplier circuits of digital LPF having an odd number of taps in total can be further reduced by one half. This is equivalent to an application of the configuration of the circuit of FIG. 16B according to the fourth embodiment to the concept of the circuit shown in FIGS. 15B, 15C according to the third embodiment.

Figure 17:
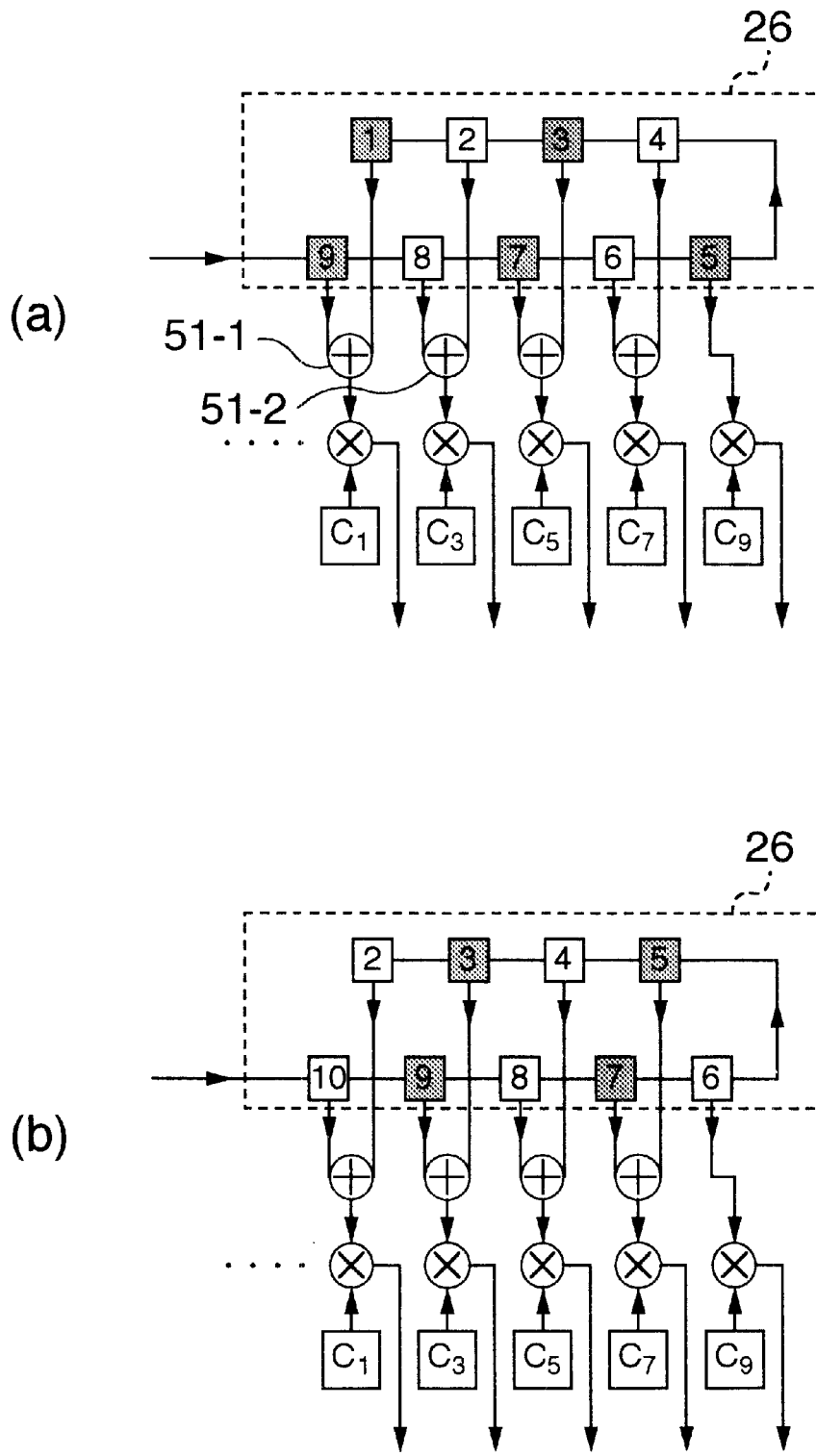
FIG. 17 is a block diagram for explaining the operating principle of the digital LPF according to a fifth embodiment of the invention.

First, when the signal of FIG. 5(c) is applied to the circuit of FIG. 15B, the shift register 26 assumes the state shown in FIG. 17(a). After that, when the next signal is applied and the signal of the shift register shifts by one stage, the state changes to the one shown in FIG. 17(b).

From FIGS. 17(a), (b), the following fact is known. Specifically, the coefficients multiplied by the values other than zero stored in the shift register are seen to alternate between the two series of coefficients each time the shift register shifts.

Figure 18:
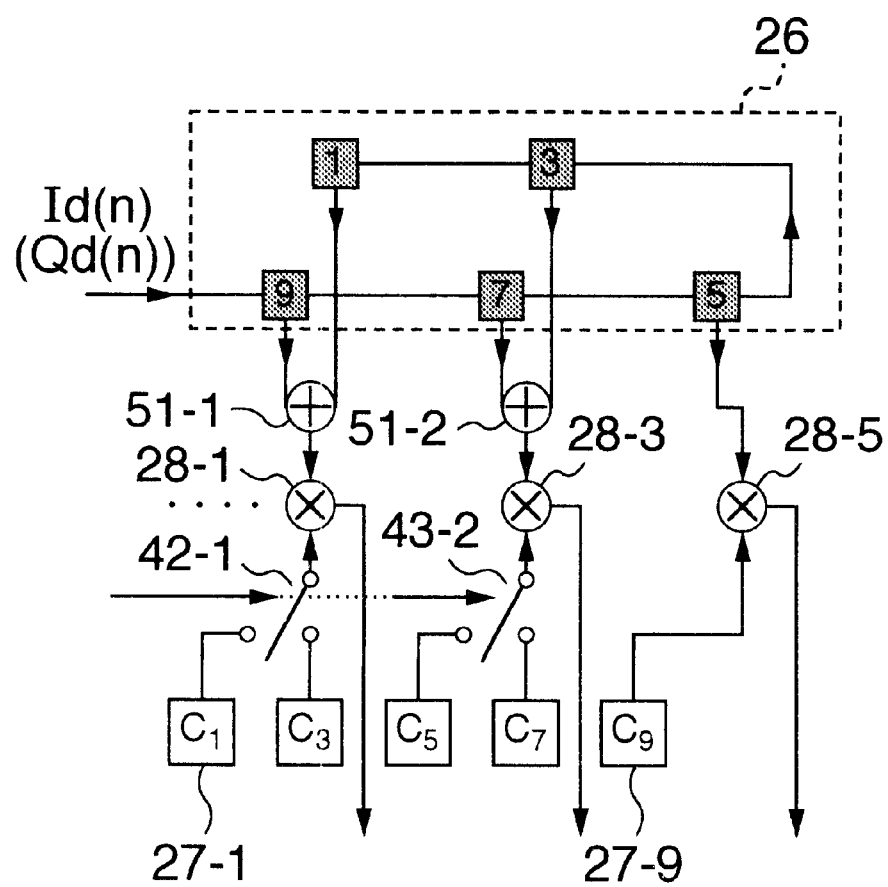
FIG. 18 is a block diagram showing an example of the configuration of the digital LPF according to the fifth embodiment of the invention.

Like in FIG. 16B according to the fourth embodiment, therefore, as shown in FIG. 18, switches 43-1, 43-2 are inserted, while at the same time inserting no zero value in the input signal so that the signal is input continuously. In other words, the double sample converters 19'$i$, 19'$q$ are eliminated.

Each time the next signal is input, the switches 43-1, etc. are operated while suspending the shifting, so that the two series of coefficients are multiplied respectively.

According to the fifth embodiment, therefore, the number of multiplier circuits required for the digital LPF can be further reduced by one half as compared with the digital LPF having an odd number of taps in the third embodiment.

Specifically, while maintaining the same function and the same performance as the circuit of FIG. 21, the number of multiplier circuits required for one of the two digital LPFs can be reduced as remarkably as to one eighth.

In the fifth embodiment, the number of multiplier circuits can be reduced only for one of the two digital LPFs. The circuit size of the multiplier circuits is so large that the simple reduction in the number of multiplier circuits of one of the digital LPFs can lead to a considerable reduction in the circuit size of the whole system.

For the filter having the characteristic given by equation (5), if designed to have an even number H (=2×R) of terms and to have symmetric coefficients, the number of multiplier circuits cannot be reduced unlike in the third embodiment.

This is by reason of the fact that the relations between the coefficients are given as $C_1=C_H$, $C_2=C_{H-1}$, $C_3=C_{H-2}$, ..., $C_R=C_{R+1}$, and therefore the first series of coefficients composed of every other one coefficient is given as $C_1$, $C_3$, ..., $C_{H-1}$, while the second series of coefficients as $C_2$, $C_4$, ..., $C_H$. One of the two series of the coefficients fails to be symmetric, and therefore this embodiment fails to produce the same effect as the third embodiment.

Even in such a case, however, if the order of the second series of coefficients is reversed, the resulting series of coefficients $C_H$, ..., $C_4$, $C_2$ is equal to that of the first series of coefficients. In this case, therefore, the circuit size can be reduced by sharing the coefficient memories.

A method of determining the values of the tap coefficient series $C_1$, $C_2$, $C_3$, ..., $C_H$ in each of the embodiments described above will be explained below with reference to FIGS. 27A, 27B. FIG. 27A shows a target frequency characteristic of the digital LPF. The cut-off area of the frequency characteristic of an actual LPF probably has a more gentle slope than shown. Given such a target frequency characteristic, an impulse response characteristic curve is determined as obtained when an impulse is input to a filter of this characteristic. The inverse Fourier transformation of the target frequency characteristic produces the impulse response characteristic curve shown in FIG. 27B. About the peak point of the impulse response curve, the series of H numerical values are sampled symmetrically at intervals of the clock period dt of the digital signal. In the case shown in FIG. 27B, H=9, and therefore the series of numerical values $C_1$, $C_2$, $C_3$, $C_4$, ... $C_9$ are obtained. This series $C_1$, $C_2$, $C_3$, $C_4$, ... $C_H$ is divided into the even numbered series $C_2$, $C_4$, $C_6$, ... $C_{2R}$ and the odd numbered series $C_1$, $C_3$, ... $C_{2R+1}$. The even numbered series $C_2$, $C_4$, $C_6$, ... $C_{2R}$ constitute the tap coefficient series for one of the digital LPFs, and the odd numbered series $C_1$, $C_3$, ... $C_{2R+1}$ constitute the tap coefficient series for the other LPF.

The circuit size and the power consumption of the digital orthogonal modulation circuit and the digital orthogonal demodulation circuit are determined substantially by the number of multiplier circuits. In the case where each LPF in the circuit of FIG. 21 requires 50 taps, for example, one LPF requires 50 multiplier circuits. Thus, the two LPFs for I and Q signals require a total of 100 multiplier circuits which are required to be operated at the clock frequency of 80 MHz for quadruple samples.

According to the first embodiment of the invention described above, in contrast, the number of taps for each LPF can be reduced to about 25 or about one half. Therefore, the number of multiplier circuits required for the two LPF multiplier circuits of I and Q signals is only 50 or about one half that required by the prior art. The circuit space can thus be reduced to about one half that of the prior art. Specifically, the circuit of FIG. 21, which has hitherto required two IC chips, uses only one IC chip.

Also, the processing speed can be reduced from the clock frequency of 80 MHz for the quadruple samples in the circuit of FIG. 21 to the clock frequency of 40 MHz of double samples for the first embodiment of the invention. The resulting power consumption is one half smaller, which combined with the fact that the number of multiplier circuits is one half less, results in the decrease in power consumption to as small as one fourth.

In similar fashion, according to the third embodiment described above, the number of multiplier circuits can be reduced to about 25 or one fourth, and therefore the circuit space can be reduced to one fourth of that required for the prior art, and the power consumption to one eighth of that required for the prior art.

It will thus be understood from the foregoing description that according to this invention, the circuit size of the digital orthogonal modulator/demodulator can be remarkably reduced, with the result that the circuit size of both the transmitter and the receiver can be remarkably reduced, thereby sufficiently reducing the size and cost of the digital signal transmission system.

Also, according to this invention, the operating speed can be reduced to one half, and therefore, in spite of the fact that the multiplier circuits not good at high-speed operation are employed, a transmission system easy to manufacture and low in cost is provided.

What is claimed is:

1. A digital signal communication system comprising:
a transmission circuit for transmitting two types of signals digitally by orthogonal modulation,
wherein said transmission circuit includes an orthogonal modulator and a non-recursive digital low-pass filter having the same frequency characteristic as a predetermined frequency characteristic of the output signal of said orthogonal modulator,
wherein assuming that the total number of taps required for determining the frequency characteristic of said nonrecursive digital low-pass filter is H and the series of tap coefficients is set as $C_1, C_2, C_3, \ldots, C_H$, where H is an arbitrary odd number of not less than 3, said nonrecursive digital low-pass filter includes a first low-pass filter for filtering one of said two types of signals, and a second low-pass filter for filtering the other of said two types of signals,
wherein said first low-pass filter has taps approximately one half of H including the tap coefficient series of $C_1, C_3, C_5, \ldots, C_{ODD}$, and said second low-pass filter has taps approximately one half of H including the tap coefficient series of $C_2, C_4, C_6, \ldots, C_{EVEN}$,
wherein the number of taps of said first low-pass filter is different by one from that of said second low-pass filter, and
wherein the tap coefficients of said first and second low-pass filters are set in such relations that $C_1=C_H$, $C_2=C_{H-1}$, $C_3=C_{H-2}, \ldots C_n=C_{H-(n-1)}$, where n is an arbitrary integer not less than 1.

2. A digital signal communication system comprising:
a transmission circuit for transmitting two types of signals digitally by orthogonal modulation,
wherein said transmission circuit includes an orthogonal modulator and a nonrecursive digital low-pass filter having the same frequency characteristic as a predetermined frequency characteristic of the output signal of said orthogonal modulator,
wherein assuming that the total number of taps required for determining the frequency characteristic of said nonrecursive digital low-pass filter is H and the series of tap coefficients is set as $C_1, C_2, C_3, \ldots, C_H$, where H is an arbitrary even number of not less than 2, said nonrecursive digital low-pass filter includes a first low-pass filter for filtering one of said two types of signals, and a second low-pass filter for filtering the other of said two types of signals,
wherein said first low-pass filter has taps one half of H including the tap coefficient series of odd numbers $C_1, C_3, C_5, \ldots, C_{ODD}$, and said second low-pass filter has taps one half of H including the tap coefficient series of even numbers $C_2, C_4, C_6, \ldots C_{EVEN}$, and
wherein the tap coefficients of said first and second low-pass filters are set in such relations that $C_1=C_H$, $C_2=C_{H-1}, C_3=C_{H-2}, \ldots C_R=C_{R+1}$, the tap coefficients of said first low-pass filter are set as $C_1, C_3, C_5, \ldots, C_{H-1}$ and the tap coefficients of said second low-pass filter are set as $C_{H-1}, C_{H-3}, \ldots C_5, C_3, C_1$, where R is an arbitrary integer.

3. A digital signal communication system comprising:
a receiving circuit for demodulating two types signals which have been orthogonally modulated,
wherein said receiving circuit includes an orthogonal demodulator and a nonrecursive digital low-pass filter having the same frequency characteristic as a predetermined frequency characteristic of the output signal of said orthogonal demodulator,
wherein assuming that the total number of taps required for determining the frequency characteristic of said nonrecursive digital low-pass filter is H and the series of tap coefficients is set as $C_1, C_2, C_3, \ldots C_H$, wherein H is an arbitrary odd number of not less than 3, said nonrecursive digital low-pass filter includes a first low-pass filter for filtering one of said two types of signals, and a second low-pass filter for filtering the other of said two types of signals,
wherein said first low-pass filter has taps approximately one half of H including the tap coefficient series of $C_1, C_3, C_5, \ldots, C_{ODD}$, and said second low-pass filter has taps approximately one half of H including the tap coefficient series of $C_2, C_4, C_6, \ldots C_{EVEN}$,
wherein the number of taps of said first low-pass filter is different by one from that of said second low-pass filter, and
wherein the tap coefficients of said first and second low-pass filters are set in such relations that $C_1=C_H$, $C_2=C_{H-1}, C_3=C_{H-2}, \ldots C_n=C_{H-(n-1)}$, where n is an arbitrary integer not less than 1.

4. A digital signal communication system comprising:
a receiving circuit for demodulating two types signals which have been orthogonally modulated, wherein said receiving circuit includes an orthogonal demodulator and a nonrecursive digital low-pass filter having the same frequency characteristic as a predetermined frequency characteristic of the output signal of said orthogonal demodulator, wherein assuming that the total number of taps required for determining the frequency characteristic of said nonrecursive digital low-pass filter is H and the series of tap coefficients is set as $C_1, C_2, C_3, \ldots, C_H$, where H is an arbitrary even number of not less than 2, said nonrecursive digital low-pass filter includes a first low-pass filter for filtering one of said two types of signals, and a second low-pass filter for filtering the other of said two types of signals, wherein said first low-pass filter has taps one half of H including the tap coefficient series of odd numbers $C_1, C_3, C_5, \ldots, C_{ODD}$, and said second low-pass filter has taps one half of H including the tap coefficient series of even numbers $C_2, C_4, C_6, \ldots, C_{EVEN}$, and wherein the tap coefficients of said first and second low-pass filters are set in such relations that $C_1=C_H$, $C_2=C_{H-1}$, $C_3=C_{H-2}$, ... $C_R=C_{R+1}$, the tap coefficients of said first low-pass filter are set as $C_1, C_3, C_5, \ldots, C_{H-1}$ and the tap coefficients of said second low-pass filter are set as $C_{H-1}, C_{H-3}, \ldots C_5, C_3, C_1$, where R is an arbitrary integer.

5. A digital signal transmission system using an orthogonal modulation method, comprising:

a first sampling rate converter for converting a first digital signal sampled at a first sampling rate into a signal sampled at a rate twice said first sampling rate by inserting an interpolation data in said first digital signal, and outputting said signal sampled at the rate twice said first sampling rate;

a second sampling rate converter for converting a second digital signal sampled at a first sampling rate and having a phase orthogonal to said first digital signal into a signal sampled at the rate twice said first sampling rate by inserting an interpolation data in said second digital signal, and outputting said signal sampled at the rate twice said first sampling rate;

a first nonrecursive digital low-pass filter circuit for passing only a predetermined frequency band of output signal of said first sampling rate converter;

a second nonrecursive digital low-pass filter circuit for passing only a predetermined frequency band of output signal of said second sampling rate converter;

first and second polarity inverting circuits for inverting the polarity of the outputs of said first and second nonrecursive digital low pass filter circuits, respectively; and a switching circuit for selectively producing the outputs of said first and second nonrecursive digital low-pass filter circuits and the outputs of said first and second polarity inverting circuits in a predetermined order.

6. A digital signal transmission system according to claim 5, wherein each of said first and second nonrecursive low-pass digital filter circuits includes a shift register having a row of a plurality of interconnected memory cells supplied with the outputs of said first and second sampling rate converters, a plurality of memories for storing the tap coefficients set for each cell of said shift register, and a plurality of multipliers for multiplying the digital signal of each cell of said shift register with said tap coefficient corresponding to each of said cells, and wherein in the case where the tap coefficients arranged sequentially on a predetermined impulse response curve for said first and second nonrecursive low-pass filter circuits are expressed as $C_1, C_2, C_3, \ldots, C_H$, the tap coefficients corresponding to the cell row for one of said first and second nonrecursive digital low-pass filter circuits are arranged as $C_1, C_3, C_5, \ldots, C_{ODD}$ and the tap coefficients corresponding to the cell row of the other of said first and second nonrecursive digital low-pass filter circuits are arranged as $C_2, C_4, C_6, \ldots, C_{EVEN}$, where H is an arbitrary positive integer not less than 2.

7. A digital signal transmission system according to claim 5, wherein each of said first and second non-recursive digital low-pass filter circuits includes a shift register having a row of a plurality of interconnected memory cells, a plurality of memories for storing the tap coefficients set for corresponding cells of said shift register, respectively, and a plurality of multipliers for multiplying the digital signal of the cell of each of said shift register with said tap coefficient corresponding to each of said cells, wherein assuming that the tap coefficients arranged sequentially on a predetermined impulse response curve for said first and second non-recursive low-pass filter circuits are expressed as $C_1, C_2, C_3, \ldots, C_H$, the tap coefficients are set in such relations that $C_1=C_H$, $C_2=C_{H-1}$, $C_3=C_{H-2}$, ... $C_n=C_{H-(n-1)}$, wherein each of said first and second nonrecursive digital low-pass filter circuits further includes a plurality of adders for adding the value of the nth cell of the shift register to the value of the (H−(n−1))th cell, and said multipliers multiply the outputs of said adders by said tap coefficients, respectively, and wherein the tap coefficients in the cell row of one of said first and second nonrecursive digital low-pass filter circuits are arranged as $C_1, C_3, C_5, \ldots, C_{2R+1}$ and the tap coefficients in the cell row of the other of said first and second nonrecursive digital low-pass filter circuits are arranged as $C_2, C_4, C_6, \ldots, C_{2R}$, where H is an arbitrary positive integer not less than 2, n is a positive integer not less than 1, and R is an arbitrary positive integer.

8. A digital signal transmission system using an orthogonal modulation method, comprising:

a first nonrecursive digital low-pass filter circuit for passing only a predetermined frequency band component of the output signal of a first digital signal sampled at a first sampling rate;

a second nonrecursive digital low-pass filter circuit for passing only a predetermined frequency band component of the output signal of a second digital signal sampled at a first sampling rate and having phases orthogonal to said first digital signal;

first and second polarity inverting circuits for inverting the polarity of the outputs of said first and second nonrecursive digital low-pass filter circuits respectively; and a switching circuit for selectively and alternately outputting the outputs of said first and second nonrecursive digital low-pass filter circuits and the outputs of said first and second polarity inverting circuits, wherein each of said first and second non-recursive digital low-pass filter circuit includes a shift register having a row of a plurality of interconnected memory cells supplied with the output of a selected one of said first and second digital signals, a plurality of memories for storing the tap coefficients corresponding to the cells of said shift register, and a plurality of multipliers for multiplying the digital signal of each cell of said shift register with said tap coefficient corresponding to each of said cells, wherein assuming that the tap coefficients arranged sequentially on a predetermined impulse response curve for said first and second nonrecursive low-pass filter circuits are expressed as $C_1, C_2, C_3, \ldots, C_H$, the tap coefficients of the cell row for one of said first and second nonrecursive digital low-pass filter circuits are arranged as $C_1, C_3, C_5, \ldots, C_{ODD}$ and the tap coefficients of the cell row for the other of said first and second nonrecursive digital low-pass filter circuits are arranged as $C_2, C_4, C_6, \ldots, C_{EVEN}$, where H is an arbitrary positive integer not less than 2, wherein two different tap coefficients adjacent to each cell of said shift register are set in one of said first and second nonrecursive digital low pass filter circuits, and wherein said digital signal transmission system further comprising:

a plurality of switches for alternately selecting and applying said two tap coefficients to said multipliers.

9. A digital signal transmission system using an orthogonal modulation method, comprising:

a first nonrecursive digital low-pass filter circuit for passing only a predetermined frequency band component of the output signal of a first digital signal sampled at a first sampling rate;

a second nonrecursive digital low-pass filter circuit for passing only a predetermined frequency band component of the output signal of a second digital signal sampled at a first sampling rate and having phases orthogonal to said first digital signal;

first and second polarity inverting circuits for inverting the polarity of the outputs of said first and second nonrecursive digital low-pass filter circuits, respectively; and a switching circuit for selectively and alternately producing the outputs of said first and second nonrecursive digital low-pass filter circuits and the outputs of said first and second polarity inverting circuits respectively, wherein each of said first and second non-recursive digital low-pass filter circuits includes a shift register having a row of a plurality of interconnected memory cells supplied with the outputs of said first and second digital signals, a plurality of memories for storing the tap coefficients corresponding to the cells of said shift register, and a plurality of multipliers for multiplying the digital signal of each of said shift registers by said tap coefficient corresponding to each of said cells, wherein assuming that the tap coefficients arranged sequentially on a predetermined impulse response curve for said first and second nonrecursive low-pass filter circuits are expressed as $C_1, C_2, C_3, \ldots, C_H$, the tap coefficients are set in such relations that $C_1=C_H$, $C_2=C_{H-1}, C_3=C_{H-2}, \ldots C_n=C_{H(n-1)}$, the tap coefficients of the cell row of one of said first and second nonrecursive digital low-pass filter circuits are arranged as $C_1, C_3, C_5, \ldots, C_{2R+1}$, and the tap coefficients of the cell row of the other of said first and second nonrecursive digital low-pass filter circuits are arranged as $C_2, C_4, C_6, \ldots, C_{2R}$, where H is an arbitrary positive integer not less than 2, n is an arbitrary positive integer not less than 1, and R is an arbitrary positive integer, wherein two different tap coefficients adjacent to each cell of said shift register are set in one of said first and second nonrecursive digital low-pass filter circuits, wherein said digital signal transmission system further comprising:

a plurality of switches for alternately selecting and applying said two tap coefficients to said multipliers, and wherein each of said first and second nonrecursive digital low-pass filter circuits further includes a plurality of adders for adding the value of the nth cell and the value of the (H–(n–1))th cell, and said multipliers multiply the outputs of said adders by said tap coefficients, respectively.

10. A digital signal receiving system for orthogonally demodulating an orthogonally modulated signal, comprising:

a delay circuit for producing a second digital signal delayed by a predetermined time behind a first digital signal of an orthogonally modulated first sampling rate;

first and second polarity inverting circuits for inverting the polarity of each of said first and second digital signals respectively;

a first switching circuit for alternately producing said first digital signal and the output signal of said first polarity inverting circuit;

a second switching circuit for alternately producing said second digital signal and the output signal of said second polarity inverting circuit;

a first nonrecursive digital low-pass filter circuit for passing only a predetermined frequency band component of the output signal of said first switching circuit;

a second nonrecursive digital low-pass filter circuit for passing only a predetermined frequency based component of the output signal of said second switching circuit;

a first sampling rate converter for converting the output signal of said first nonrecursive digital low-pass filter circuit into a signal sampled at the rate one half of said first sampling rate and outputting the digital signal sampled at the rate of one half and having mutually orthogonal phases; and a second sampling rate converter for converting the output signal of said second nonrecursive digital low-pass filter circuit into a signal sampled at the rate one half of said sampling rate and outputting the digital signal sampled at one the rate of one half and having mutually orthogonal phases.

11. A digital signal receiving system according to claim 10, wherein each of said first and second non-recursive digital low-pass filter circuits includes a shift register having a row of a plurality of interconnected memory cells supplied with the outputs of said switching circuits, a plurality of memories for storing the tap coefficients corresponding to the cells of said shift register, respectively, and a plurality of multipliers for multiplying the digital signal of each cell of said shift register by said tap coefficient corresponding to each of said cell, and wherein assuming that the tap coefficients arranged sequentially on a predetermined impulse response curve for said first and second nonrecursive low-pass filter circuits are expressed as $C_1, C_2, C_3, \ldots, C_H$, the tap coefficients of the cell row for one of said first and second nonrecursive digital low-pass filter circuits are arranged as $C_1, C_3, C_5, \ldots, C_{ODD}$ and the tap coefficients of the cell row of the other of said first and second nonrecursive digital low-pass filter circuits are arranged as $C_2, C_4, C_6, \ldots, C_{EVEN}$, where H is an arbitrary positive integer not less than 2.

* * * * *